(12) United States Patent
Kendall et al.

(10) Patent No.: US 9,198,345 B2
(45) Date of Patent: Dec. 1, 2015

(54) ADAPTABLE SPREADER

(71) Applicant: Earthway Products Inc., Bristol, IN (US)

(72) Inventors: Jeffrey D. Kendall, Laurel, MD (US); Richard Sevrey, Bristol, IN (US); Richard H. Chapman, Camillus, NY (US)

(73) Assignee: Earthway Products, Inc., Bristol, IN (US)

( * ) Notice: Subject to any disclaimer, the term of this patent is extended or adjusted under 35 U.S.C. 154(b) by 72 days.

(21) Appl. No.: 13/919,682

(22) Filed: Jun. 17, 2013

(65) Prior Publication Data

US 2013/0292483 A1 Nov. 7, 2013

Related U.S. Application Data

(63) Continuation-in-part of application No. 13/661,620, filed on Oct. 26, 2012.

(60) Provisional application No. 61/552,030, filed on Oct. 27, 2011.

(51) Int. Cl.
*A01C 15/00* (2006.01)
*A01C 17/00* (2006.01)
*B05B 7/14* (2006.01)
*B05B 15/06* (2006.01)
*A01C 15/02* (2006.01)
*E01C 19/20* (2006.01)

(52) U.S. Cl.
CPC .............. *A01C 15/006* (2013.01); *A01C 15/02* (2013.01); *A01C 17/006* (2013.01); *B05B 15/06* (2013.01); *E01C 19/203* (2013.01); *E01C 2019/206* (2013.01)

(58) Field of Classification Search
CPC ..... A01C 15/006; A01C 17/001; B05B 7/1404
USPC ............. 239/7, 600, 650, 651, 661, 663, 668, 239/676, 681, 687
See application file for complete search history.

(56) References Cited

U.S. PATENT DOCUMENTS

| | | | |
|---|---|---|---|
| 2,986,305 A | 5/1961 | Koerper et al. | |
| 3,888,196 A | 6/1975 | Glenn | |
| 4,136,804 A | * 1/1979 | Kinzler et al. | 222/547 |

(Continued)

FOREIGN PATENT DOCUMENTS

| | | | |
|---|---|---|---|
| DE | 10 2005 052 741 A1 | | 5/2007 |
| GB | 421826 | * | 12/1934 |
| GB | 421826 A | | 12/1934 |

OTHER PUBLICATIONS

International Search Report and Written Opinion of the International Searching Authority, dated Jan. 15, 2013.

*Primary Examiner* — Ryan Reis
(74) *Attorney, Agent, or Firm* — Kegler Brown Hill & Ritter; James J. Pingor

(57) ABSTRACT

A particulate dispersing apparatus is provided that includes a vessel configured to contain particulate material, an insert disposed inside the vessel and having a first hole pattern and adapted to be removed from the vessel, and at least one fastener having a cylindrical body and a pair of projections extending in opposite directions from a bottom of the cylindrical body. The pair of projections are substantially perpendicular to the cylindrical body and secures the insert to the vessel. The fastener is rotatable between a securing position and an unsecuring position.

15 Claims, 24 Drawing Sheets

(56) References Cited

U.S. PATENT DOCUMENTS

| | | | |
|---|---|---|---|
| 5,287,999 A * | 2/1994 | Olsen | 222/616 |
| 6,293,438 B1 * | 9/2001 | Woodruff | 222/342 |
| 7,044,408 B2 * | 5/2006 | Schoenfeld | 239/659 |
| 8,066,206 B1 * | 11/2011 | Cotham | 239/653 |
| 2004/0026544 A1 * | 2/2004 | Williams et al. | 239/656 |
| 2011/0309170 A1 | 12/2011 | Weeks | |

* cited by examiner

ADAPTABLE SPREADER

CROSS-REFERENCE TO RELATED APPLICATIONS

This application is a Continuation-in-Part of U.S. Non-Provisional patent application Ser. No. 13/661,620 entitled "ADAPTABLE SPREADER" filed on Oct. 26, 2012, the entirety of which is herein incorporated by reference.

ORIGIN

The innovation disclosed herein relates to a particulate dispersing apparatus and, more specifically, to a spreader having interchangeable inserts to accommodate the dispersement of different sized particulate material.

BACKGROUND

Traditional material spreaders have been designed to include a container, known as a hopper, from which particulate materials can be emptied slowly and evenly onto a spinning disk, called an impeller, so as to then be distributed in a pattern to a lawn or other like surface. Generally, the hoppers comprise side walls that taper inwardly from an open top to a flat, closed bottom through which one or more holes are pierced in such a location as to allow material to be emptied directly upon the surface of the spinning impeller. A problem with the traditional design is that the flat hopper bottom tends to gather material about its edges and upon its surface, oftentimes precluding complete emptying of the hopper, in what is known as bridging.

Another disadvantage to the traditional spreader is that although the traditional spreader has a means to adjust the output dispensing rate of the material, the traditional spreaders do not have a means to disperse particulate material that vary in size. For example, the traditional spreaders cannot adapt to disperse very fine particulate material, such as grass seed, up to larger particulate material, such as rock salt, stone, etc. in a uniform manner.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof comprises a particulate dispersing apparatus that includes a vessel configured to contain particulate material, an insert disposed inside the vessel and having a first hole pattern and adapted to be removed from the vessel, and at least one fastener having a cylindrical body and a pair of projections extending in opposite directions from a bottom of the cylindrical body, the pair of projections being substantially perpendicular to the cylindrical body, the at least one fastener being adapted to secure the insert to the vessel, wherein the fastener is rotatable between a securing position and an unsecuring position, and wherein the pair of projections being adapted to engage the vessel in the secured position.

The innovation disclosed and claimed herein, in one aspect thereof comprises a system for dispersing particulate material that includes a vessel configured to contain particulate material and having an opening defined in a bottom portion, a plurality of interchangeable inserts adapted to be removably attached to an inside of the vessel whereby the plurality of interchangeable inserts has distinct hole patterns to facilitate the flow of different sized particulate material from inside the vessel, and a dispersing mechanism that disperses the particulate material flowing through the distinct the hole patterns.

In another aspect of the innovation, the distinct hole patterns includes at least one opening defined in a bottom surface of the plurality interchangeable inserts and wherein the at least one opening for the plurality of interchangeable inserts is of a different size.

In still yet another aspect of the innovation, a particulate dispersing apparatus is provided that includes a vessel configured to contain particulate material and having an opening defined in a bottom portion, at least one insert removably attached to an inside of the vessel such that a bottom portion of the insert extends into the opening of the vessel, the at least one insert having a funnel like shape to facilitate the flow of the particulate material through at least one opening defined in a bottom of the insert, and a dispersing mechanism that disperses the particulate material flowing through the at least one opening.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
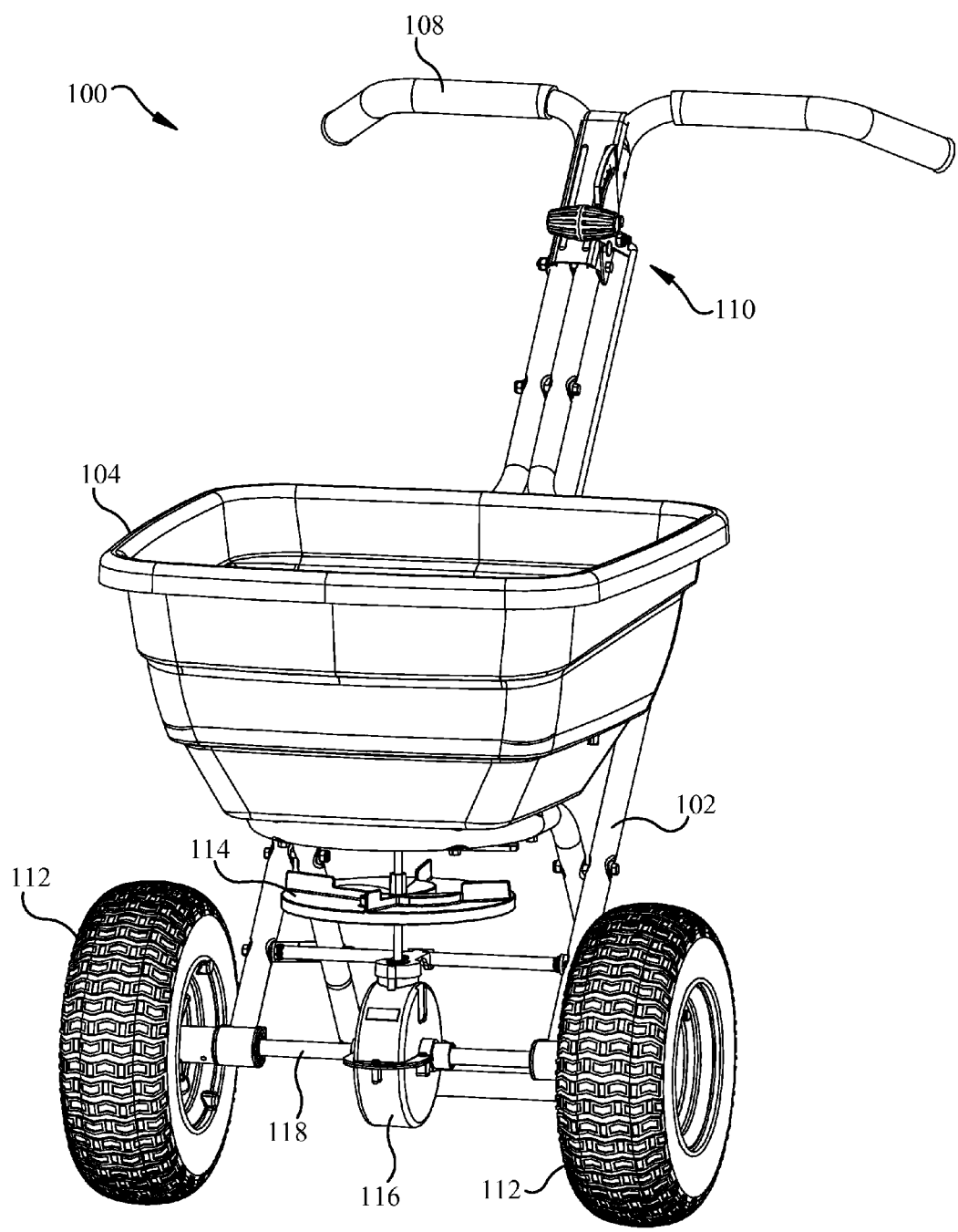
FIG. 1 is a perspective view of an example particulate dispensing apparatus featuring the innovation disclosed herein in accordance with the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

The innovation described herein discloses a particulate dispersement apparatus and, more specifically, a spreader capable of evenly and uniformly dispersing particulate material of various sizes (e.g., seed, fertilizer, rock salt, stone, etc.). In various aspects, the subject innovation includes various features not available in conventional spreaders.

Embodiments of the subject innovation include a spreader that can be used with any of a plurality of interchangeable and readily installable (e.g., snap-in) trays or inserts. This spreader can incorporate a hopper different from conventional hoppers in that it has no bottom or has a removable bottom, and is adapted to engage with any of the plurality of inserts. These trays or inserts can be self-cleaning hopper inserts or trays that can allow a user to effectively have a plurality of different spreaders in one, by changing inserts depending on the situation. For example, any of the plurality of inserts with unique drop hole patterns discussed infra can be used, as well as other variations that would be understood by a person of skill in the art in light of the teachings herein. In other aspects, the innovation can incorporate substantially any conventional drop hole pattern into a novel insert useable with the subject innovation. Further aspects can include conventional patterns modified to incorporate some or all the novel features discussed herein in connection with various inserts.

As described further below, different variations of hopper inserts are disclosed where each insert includes a different hole pattern, with each pattern configured to meet the specific demands of different materials, applications, and outputs. Although only a limited number of patterns are discussed, it is to be understood that other variations can be adapted for other purposes in light of the discussion herein.

Additionally, embodiments of the subject innovation address problems encountered by conventional systems (e.g., bridging), and can be "self-cleaning" in that the configuration can allow material to flow unimpeded out of the hopper. The hopper portion of the subject innovation can be similar to the traditional design, except, as mentioned above, that its bottom can be open and in its place, any of a plurality of removable inserts can be introduced, for example, depending on the application or material. Unlike the flat bottoms of the traditional hoppers, the removable insert can be generally funnel-shaped (e.g., can be part of a pyramidal, conic, or other shape wherein the cross-section tends to decrease toward an apex, etc.), transitioning from the cross-sectional shape of the mating hopper at its periphery downwardly to an imaginary apex outside of its body. Because of the tapering of the insert, material in the hopper will move toward the apex as the material is pulled downwardly by gravity.

In various embodiments, the insert can further comprise a collection cup, which can be a downwardly extending portion of the insert. The collection cup can have one or more outlet holes through which material can exit the hopper. Because the inwardly tapered side walls of the cup can be vertically aligned with the apex of the insert (e.g., such that the apex is aligned above, below, or within the cup, etc.), gravity will cause material to flow into the cup and then through the one or more outlet holes. In those embodiments where multiple outlet openings may be required, all of those openings can exist within the confines of the collection cup, and material flow can be further directed by the inclusion of and shaping of housing material that can exist between each pair of openings. For example, in instances in which there is a surface between a pair of openings, that surface can be tapered downwardly toward an opening, rather than being horizontal. This feature can provide for more efficient dispensing of material in a variety of ways, for example, in that the tapered shape of the surface can prevent material from remaining on it. Because of this, all material can escape the hopper/insert assembly, in contrast to conventional systems.

In other aspects, the subject innovation can include an agitator to minimize bridging and facilitate proper material flow, such as but not limited to oscillating fingers described further below. In various embodiments, these oscillating fingers or another agitator can be incorporated into spreaders using interchangeable inserts, as well as into a "fixed" spreader. In various embodiments, the agitator can reside in the shut-off plate portion of the assembly. The fingers can be an upwardly protruding portion of the agitator, such as pins, etc., and can protrude upwardly away from said shut-off plate and through each of the drop holes. In aspects, the fingers can protrude through the drop holes a specified distance into the hopper insert or tray. The oscillating motion of the fingers can create air-gaps and can assist gravity in the process of feeding materials that otherwise have a tendency to bridge and therefore not flow properly. The oscillating motion of the fingers can encourage materials to move at a constant rate into the drop holes, thereby creating an even flow of the material onto the impeller (the spinning disk below the drop holes). This flow facilitates a superior spread pattern, even with very difficult to spread materials.

In other aspects, the innovation can also incorporate a floating gearbox. In these aspects, the "fixed" axle that has been the industry standard for commercial & professional gearboxes can be replaced by an axle that uses a novel parabolic drive to power the gearbox. This can reduce user effort in operation. Additionally, less space than that required for the packaging of current gear boxes will be required for the packaging of the new assemblies.

Figure 2:
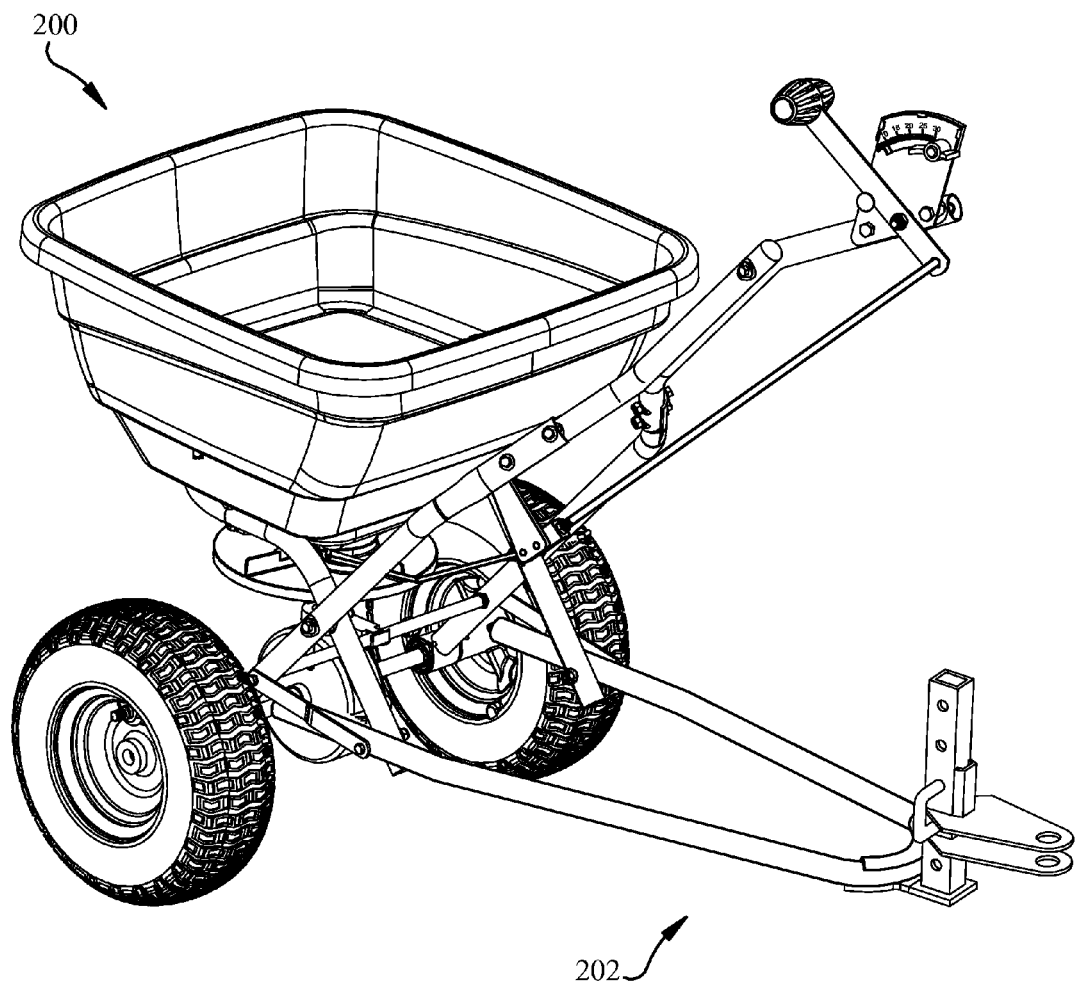
FIG. 2 is a perspective view of another example particulate dispensing apparatus featuring the innovation disclosed herein in accordance with the innovation.
Figure 3:
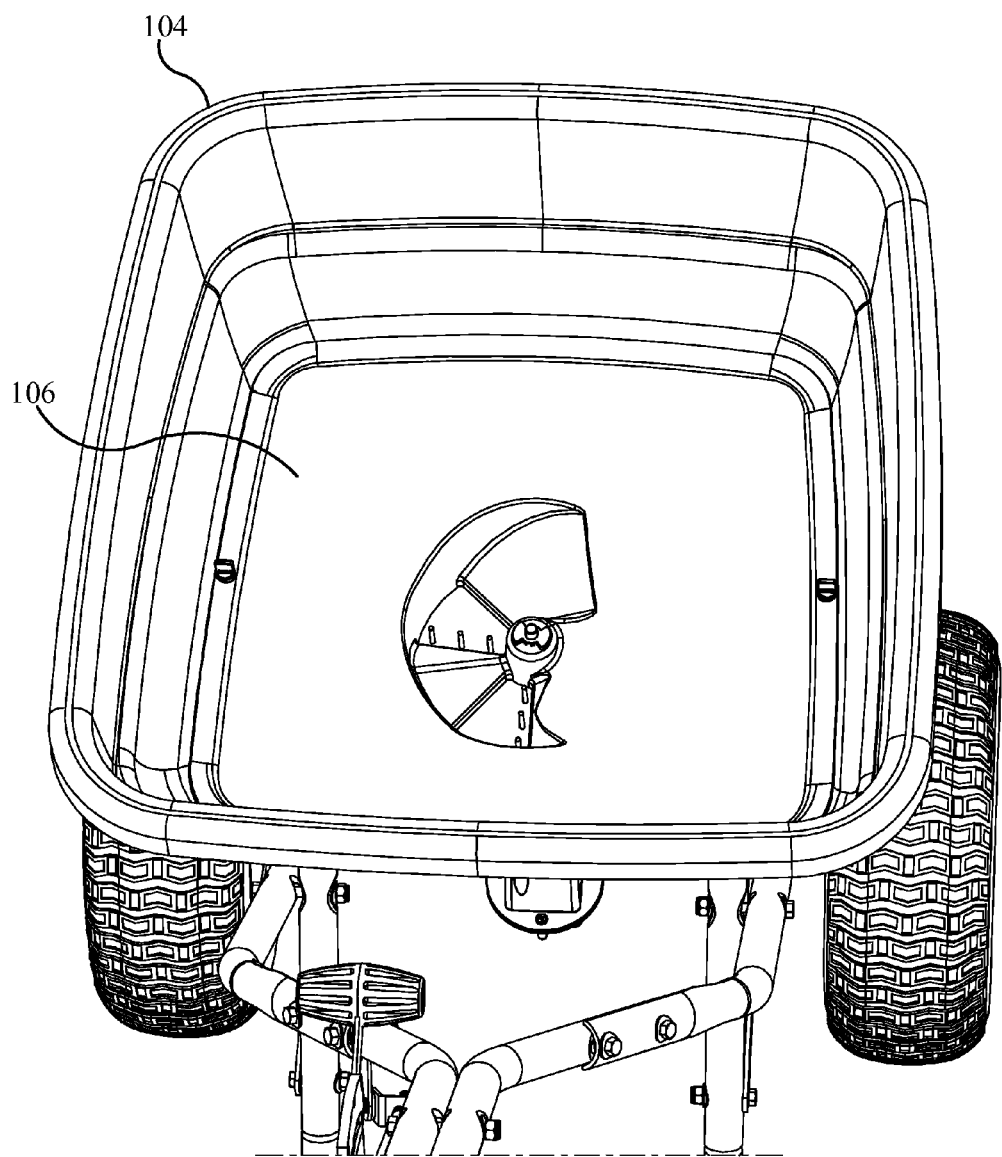
FIG. 3 is a top perspective view of the example particulate dispensing apparatus of FIG. 1 in accordance with an aspect of the innovation.

With reference now to the figures, FIG. 1 illustrates an example embodiment of a particulate dispersing apparatus 100 that is part of an innovative system and method for changing a particulate output of the dispersing apparatus 100 in accordance with aspects of the innovation. It is to be understood that the particulate dispersing apparatus 100 may be any type of particulate dispersing apparatus capable of dispersing particulate material, such as but not limited to a lawn seed/fertilizer spreader, a salt spreader, etc. In addition, the particulate dispersing apparatus 100 may be a walk behind type spreader, a hand-held type spreader, a tow-type spreader 200 having a connection device 202 to connect the spreader 200 to a vehicle, as shown in FIG. 2, etc. The example particulate dispersing apparatus 100 illustrated in FIG. 1 is a walk behind type spreader and will be used to describe the innovation disclosed herein. Thus, the example particulate dispersing apparatus 100 illustrated in FIG. 1 is for purposes of illustration only and is not intended to limit the scope of the innovation.

Referring to FIGS. 1 and 3-5, the example particulate dispersing apparatus 100, which as mentioned above is a walk behind spreader, includes a frame 102, a vessel or hopper 104 mounted to the frame 102 (see FIG. 4), a removable insert 106 disposed inside the hopper 104, a push handle 108 mounted to the frame 102, an open-close/adjustment (shut-off) assembly 110, a pair of wheels 112, a dispersing mechanism 114 to disperse product from inside the hopper 104, and a gear box 116 operatively connecting the wheels 112 and the dispersing mechanism 114 via an axle 118 and a gear/impeller shaft 120.

Figure 5:
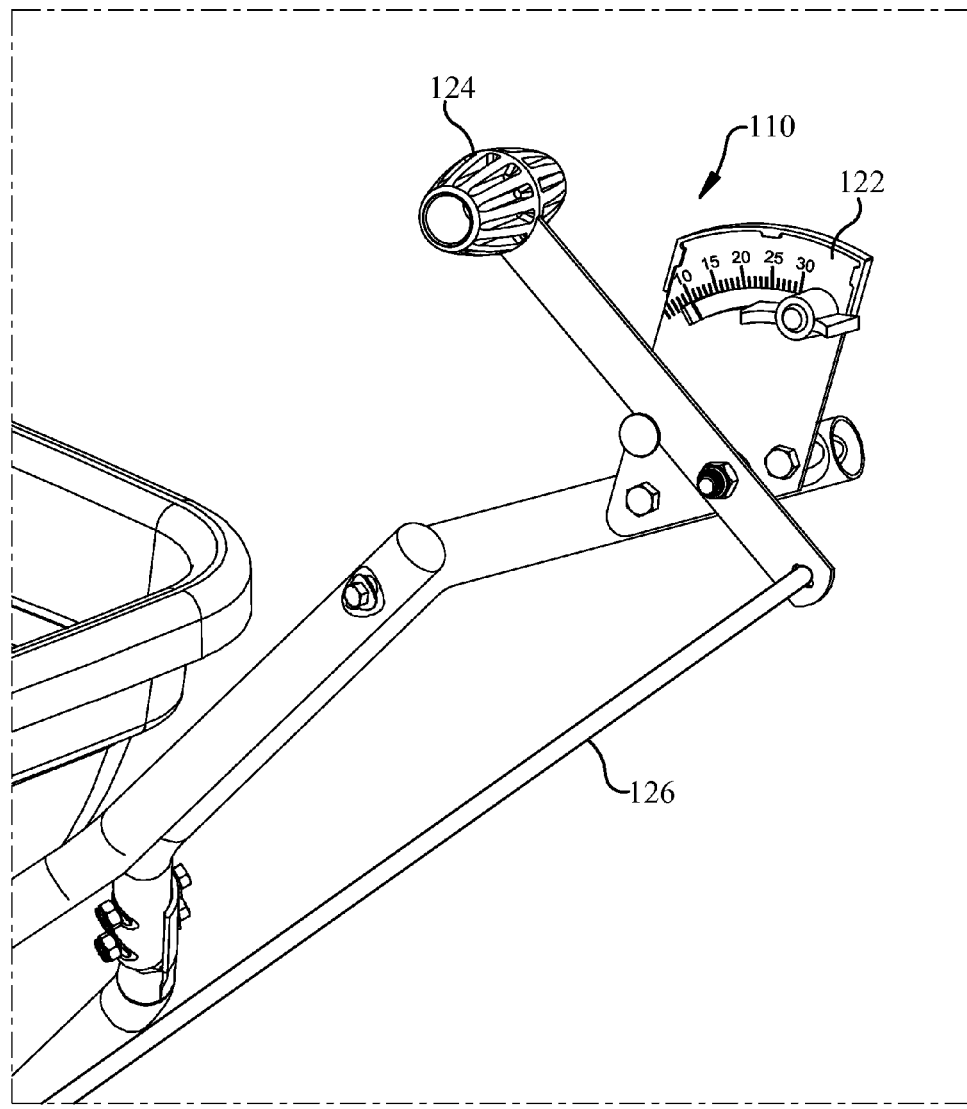
FIG. 5 is a close-up view of an open-close/adjustment assembly in accordance with an aspect of the innovation.
Figure 6A:
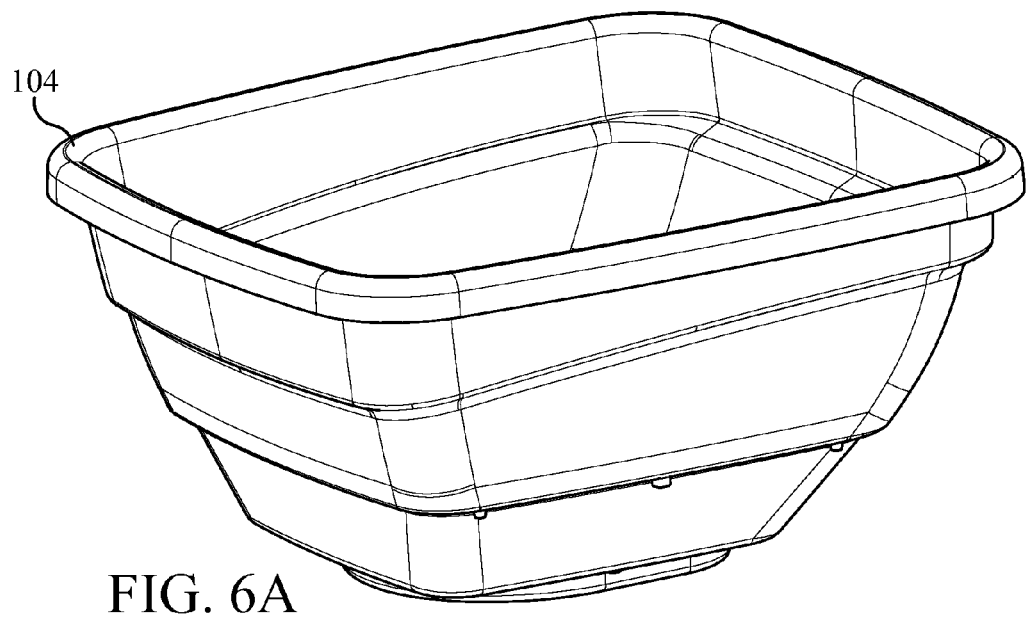
FIGS. 6A-6D are a perspective, top, bottom, and side view of an example hopper in accordance with an aspect of the innovation.
Figure 6B:
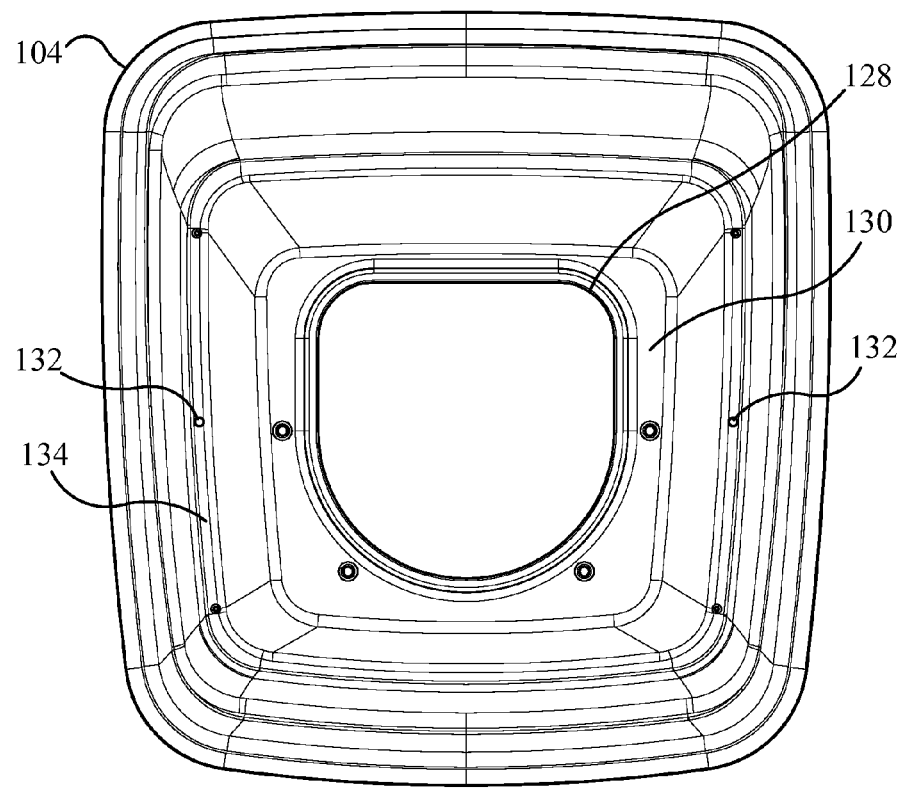
Figure 6C:
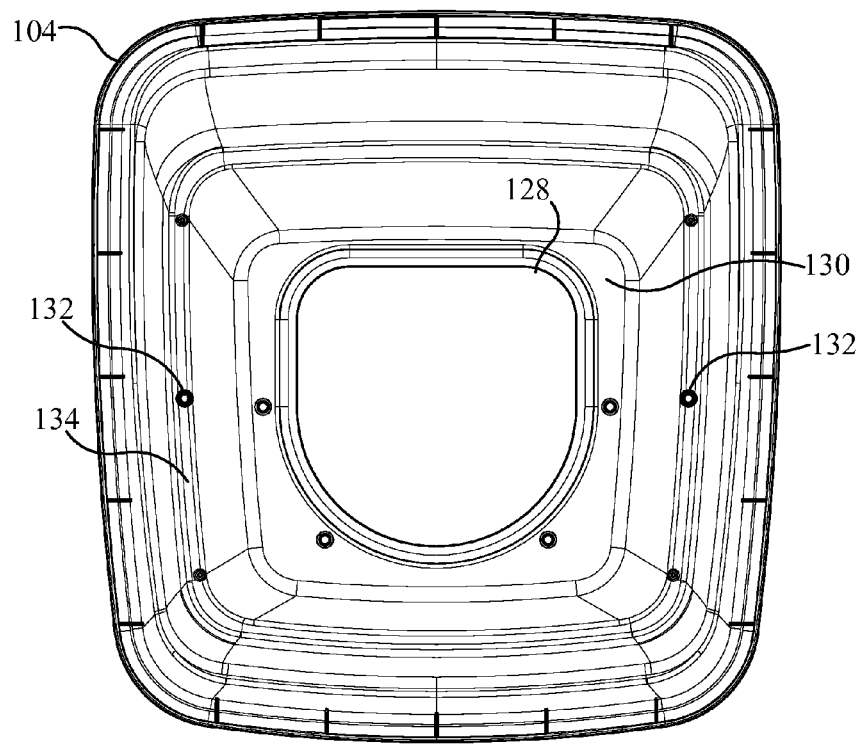
Figure 6D:
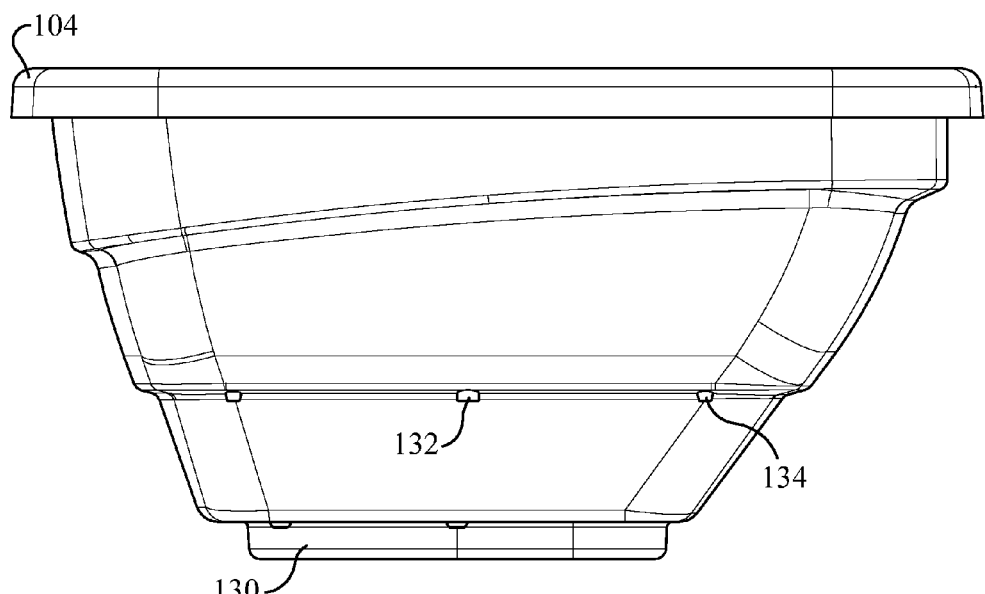

Referring to FIG. 5, the open-close/adjustment assembly 110 includes a gauge 122, an adjustable lever 124 connected to the gauge 122, a rod 126 connected to the lever 124 at one end and to a shut-off/adjustment plate described further below at an opposite end. When the lever 124 is in a first (full forward) position, as shown in FIG. 5, the open-close/adjustment assembly 110 is in a full closed position. In this position, the shut-off/adjustment plate of the removable insert 106 is in a full closed position thereby preventing any particulate material from exiting the dispersing apparatus 100. Conversely, when the lever 124 is in a second (full rearward) position, the open-close/adjustment assembly 110 is in a full open position. In this position, the shut-off/adjustment plate of the removable insert 106 is in a full open position, thus, allowing a maximum flow of particulate material to be dispersed by the dispersing apparatus 100. The shut-off/adjustment plate of the removable insert 106 can be operated at any position between the full closed position and the full open position to thereby vary the amount of particulate material dispersed by the dispersing apparatus 100.

Referring to FIGS. 6A-6D, the hopper 104 has a square type shape, as viewed from the top, but it is to be understood that the shape of the hopper 104 can be any shape, such as but not limited to rectangular, circular, etc. An opening 128 is defined in a bottom 130 of the hopper 104 and is adapted to receive a bottom portion of the removable insert 106 as will be described further below. Attachment apertures 132 are defined in a ridge 134 in two or more sides of the hopper 104 and are adapted to receive a fastening device to secure the removable insert 106 to the hopper 104.

Figure 7A:
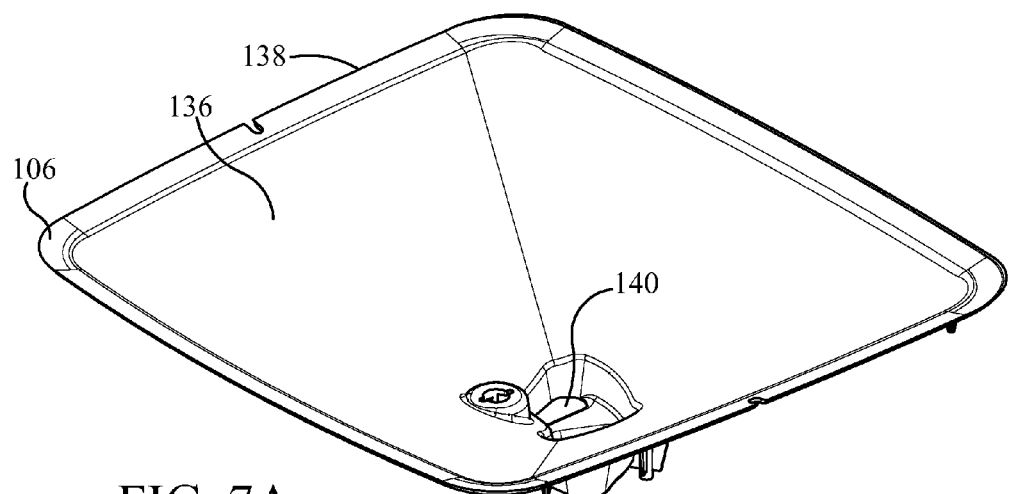
FIGS. 7A-7C are a perspective, top, and side view of an example removable insert in accordance with an aspect of the innovation.
Figure 7B:
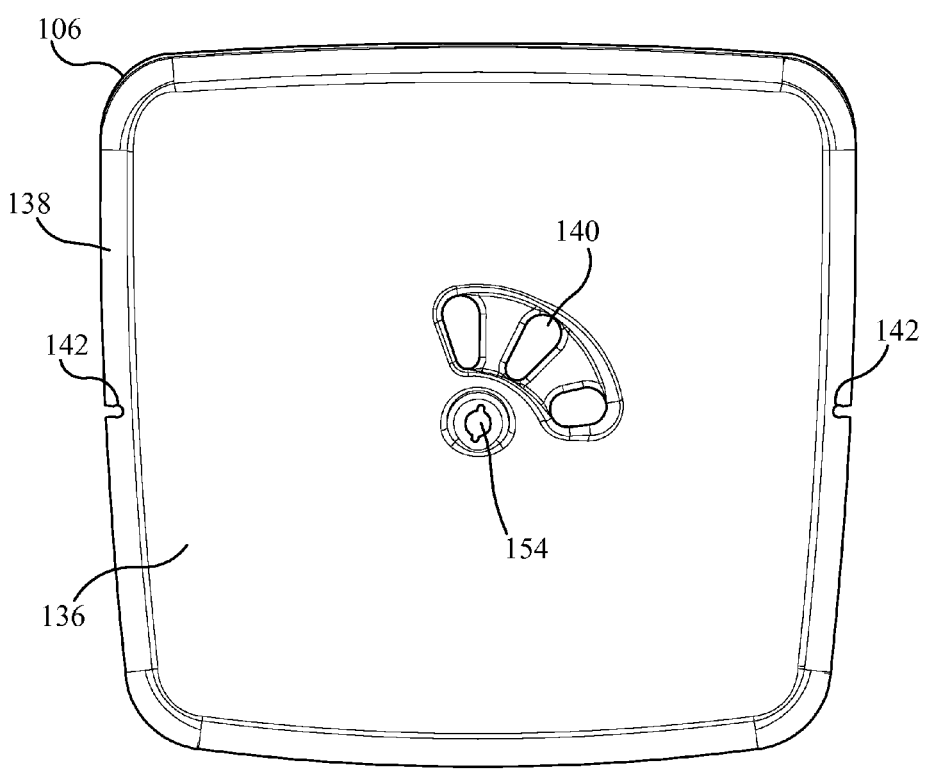
Figure 7C:
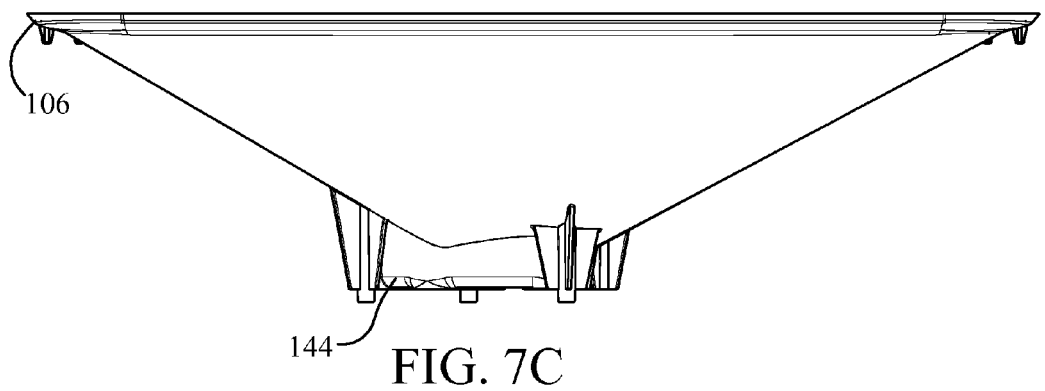

Referring to FIGS. 7A-7C, as mentioned above, the dispersing apparatus 100 includes one or more removable inserts 106 disposed inside the hopper 104. The removable insert 106 is configured to have a shape similar to an inside shape of the hopper 104. In the example illustrated in the figures, as viewed from the top in FIG. 6B, the removable insert 106 has a square shape, but can be configured to have any shape to conform to the shape of the hopper 104, such as but not limited to rectangular, circular, etc. In addition, the removable insert 106 has a concave or funnel shape whereby a bottom surface 136 transitions downward from a perimeter 138 toward one or more openings 140 defined in the bottom surface 136 of the removable insert 106. This configuration facilitates optimal flow of the particulate material out of the hopper 104, as will be illustrated further below.

Figure 4:
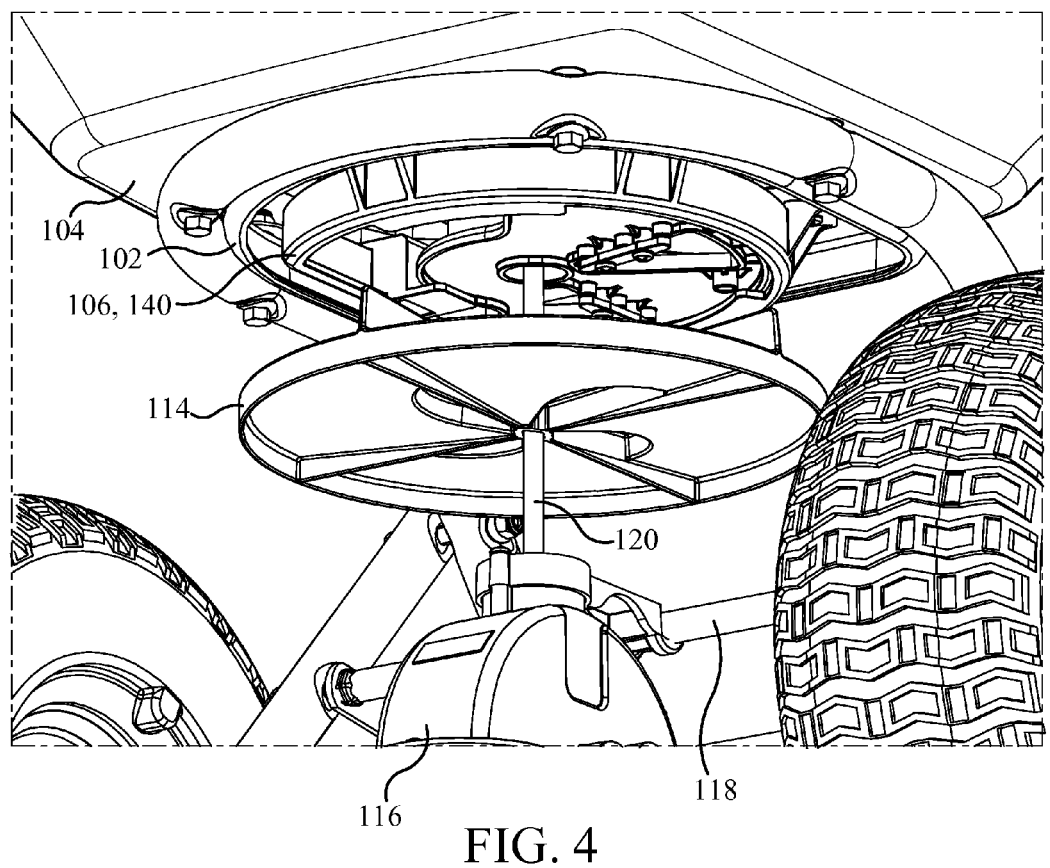
FIG. 4 is a bottom perspective view of the example particulate dispensing apparatus of FIG. 1 in accordance with an aspect of the innovation.
Figure 8:
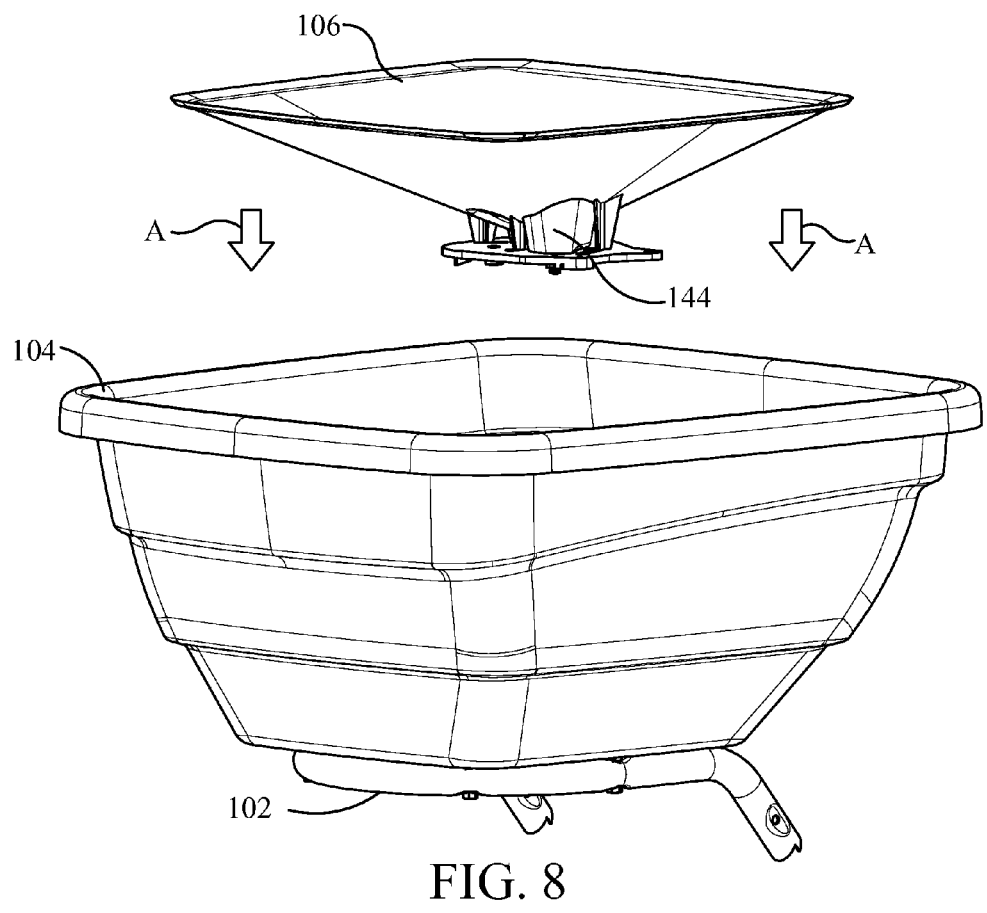
FIG. 8 is perspective view illustrating placement of the removable insert into the vessel in accordance with an aspect of the innovation.
Figure 9:
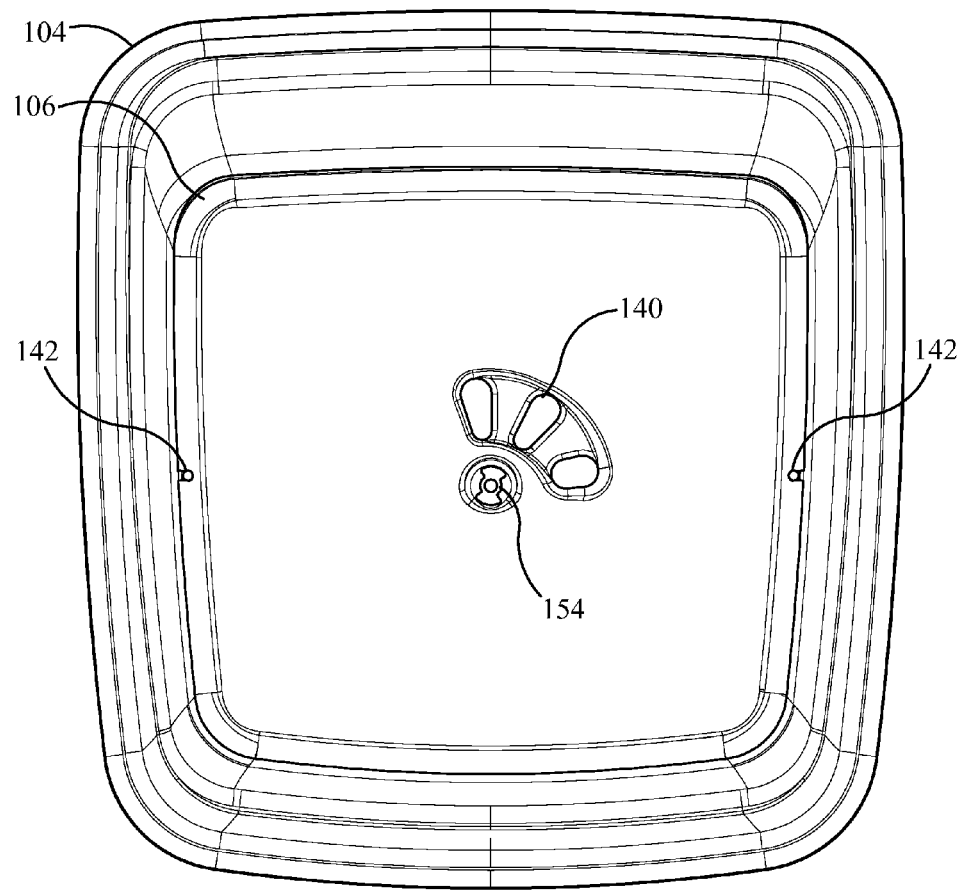
FIG. 9 is a top view of a vessel illustrating the placement of the removable insert in accordance with an aspect of the innovation.

The removable insert 106 further includes attachment slots 142 defined in the perimeter 138 of the removable insert 106, which align with the attachment apertures 132 defined inside the hopper 104 to facilitate attachment of the removable insert 106 to the hopper 104. To secure the removable insert 106 inside the hopper 104, the removable insert 106 is placed inside the hopper 104 as shown by the arrows A in FIG. 8 such that a bottom portion 144 of the removable insert 106 extends into the opening 128 defined in the hopper 104, which is best shown in FIG. 4. Once properly inserted, the perimeter 138 of the removable insert 106 engages the ridge 134 inside the hopper 104 such that the removable insert 106 sits inside the hopper 106, as shown in FIG. 9. In addition, once the removable insert 106 is properly inserted, the attachment slots 142 defined in the removable insert 106 are aligned with the attachment apertures 132 defined in the hopper 104.

Figure 10:
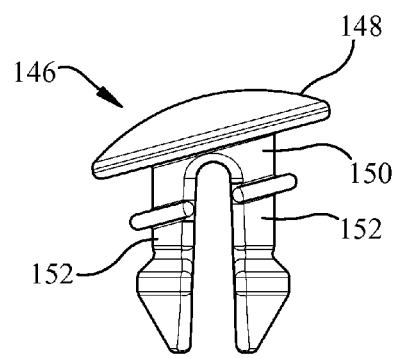
FIG. 10 is a side view of an example fastening device in accordance with an aspect of the innovation.

A fastener 146 is inserted into and through both the attachment slots 142 and the attachment apertures 132 to secure the removable insert 106 to the hopper 104. The fastener may be any type of mechanical fastener, such as but not limited to, a snap type fastener, a clip, a screw, a nut and bolt, etc. An example of a snap type fastener is illustrated in FIG. 10. The fastener 146 includes a head 148 and a body 150 having a pair of legs 152 separated by a gap 154. The head 148 is pitched to conform to a pitch of the hopper 104 and the removable insert 106 to insure that the removable insert 106 sits flush against the inside surface of the hopper 104. This head 148 configuration insures that the perimeter 138 of the removable insert 106 and/or the fastener 146 do not impede the flow of particulate material out of the hopper 104. The legs 152 of the fastener 146 compress toward each other when the fastener 146 is inserted into and removed from both the attachment slots 142 and the attachment apertures 132. Once fully inserted, the fastener 146 secures the removable insert 106 to the hopper 104.

Referring to FIGS. 7B and 9, a shaft aperture 154 is defined in the bottom portion 144 of the removable insert 106 and is adapted to receive the gear/impeller shaft 120 that extends upward from the gear box 116 into the hopper 104. A batwing-like shaped bushing placed over the gear/impeller shaft and engages the removable insert 106 provides support for the gear/impeller shaft 120 and is removable to allow replacement of the removable insert 106, as will be described further below.

Figure 11:
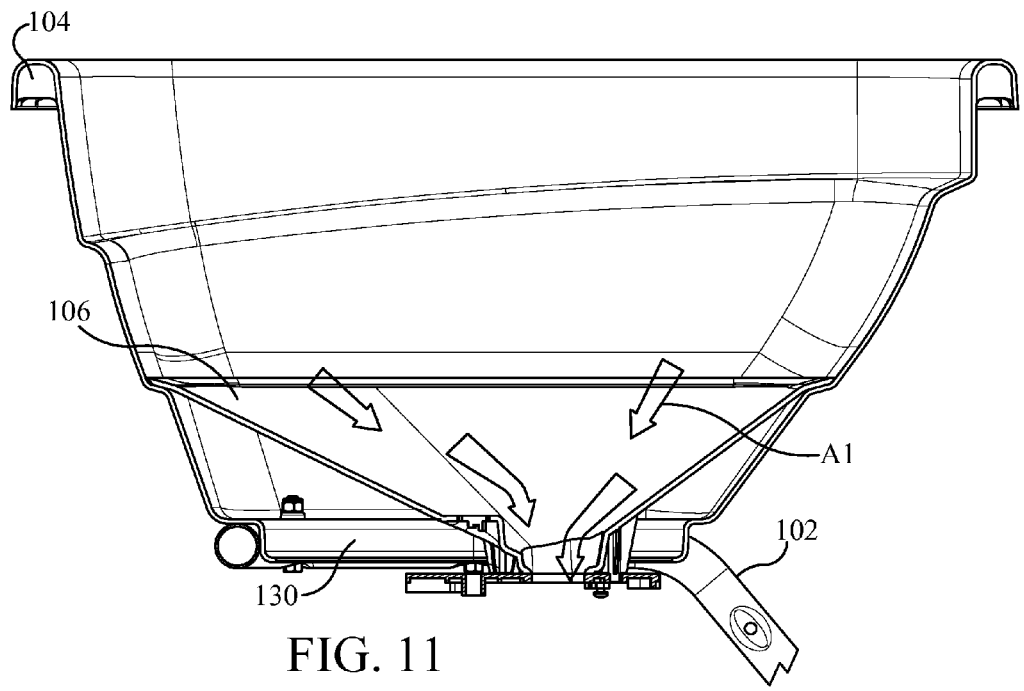
FIG. 11 is a cut-out side view of an example vessel and removable insert illustrating a flow pattern of particulate material in accordance with an aspect of the innovation.

Referring to FIG. 11, as mentioned above, the removable insert 106 has a concave or funnel like shape. In other words, the bottom surface 136 of the removable insert 106 slopes in a downward direction from the perimeter 138 toward the one or more openings 140 defined in the removable insert 106. This shape facilitates the flow of the particulate material through the one or more openings 140 and out of the hopper 104. Specifically, the particulate material easily flows in the direction indicated by the arrows A1 in FIG. 11.

Thus, as mentioned above, the innovative configuration addresses bridging problems encountered by conventional spreader systems. In addition, the innovative configuration can be "self-cleaning" in that the configuration allows particulate material to flow unimpeded out of the hopper. Still further, the innovative particulate dispensing system and method includes interchanging removable inserts whereby each removable insert includes one or more openings, thus, forming a specific hole pattern configured to meet specific demands of different materials, applications, and outputs. Disclosed below are several example embodiments of removable inserts having different hole patterns and, thus, different particulate applications and outputs. It is to be understood, that the examples described herein are for illustrative purposes only and are not intended to limit the scope of the innovation.

Figure 12:
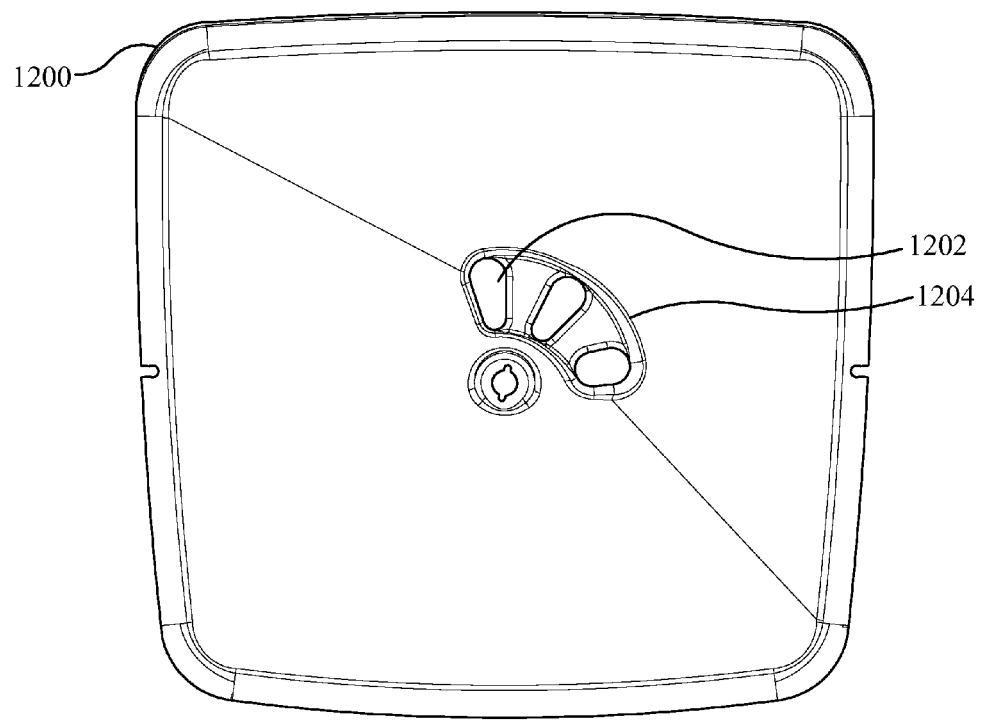
FIG. 12 is a top view of an example embodiment of a removable insert in accordance with an aspect of the innovation.

Referring to FIG. 12, a first example embodiment of a removable insert 1200 is illustrated in accordance with an aspect of the innovation. The removable insert 1200 includes multiple (i.e., three) small openings 1202 thereby forming a first hole pattern 1204, whereby the multiple openings 1202 have a predetermined size. Thus, the removable insert 1200 is configured for use with particular material that corresponds to the size of the multiple openings 1202, such as but not limited to, fertilizers, lawn chemicals, ice melt, and other materials for general purpose use.

Figure 13:
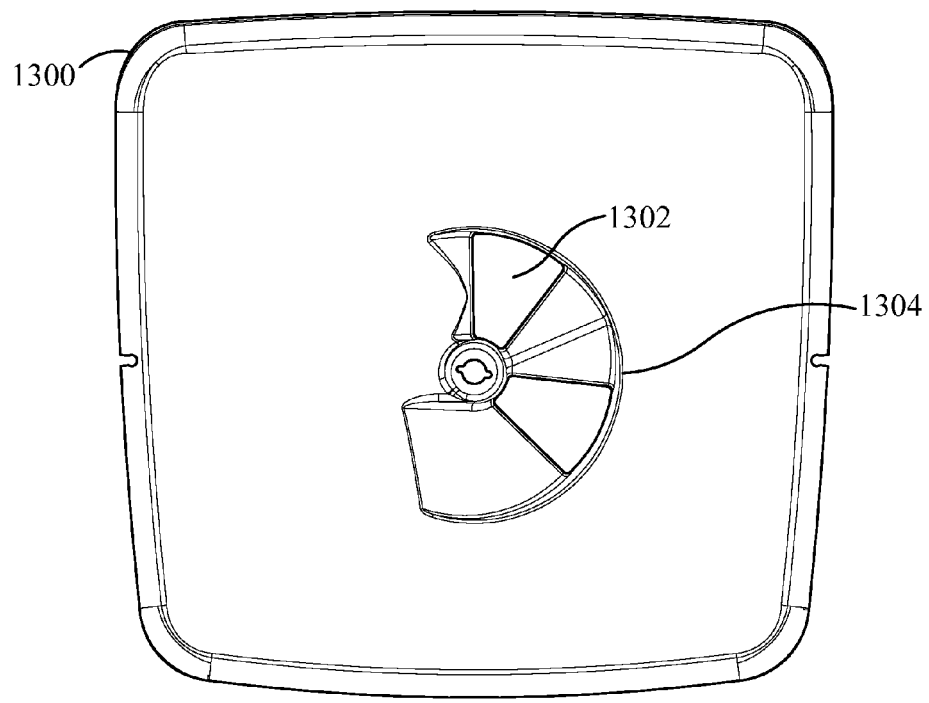
FIG. 13 is a top view of another example embodiment of a removable insert in accordance with an aspect of the innovation.

Referring to FIG. 13, a second example embodiment of a removable insert 1300 is illustrated in accordance with an aspect of the innovation. The removable insert 1300 includes multiple (i.e., two) larger openings 1302 thereby forming a second hole pattern 1304 that produces a high particulate output. Because the openings 1302 are larger than the openings 1302 described above, the hole pattern 1304 is more suitable for use with larger particulate material such as rock salt, damp sand, and/or, organic fertilizers that have a larger particle size and/or are most effectively distributed at a high application rate. Thus, the removable insert 1300 is for applications that require a high volume output of particulate material. In addition, a spread pattern generated by the removable insert 1300 can be an approximately 180 degree semi-circle from the center of the gearbox, forward or opposite to the operator or user, and can be in line with the direction of the operation on a walk behind spreader, or rearward or opposite to the operator and in line away from with the direction of the operation on a tow spreader.

Figure 14:
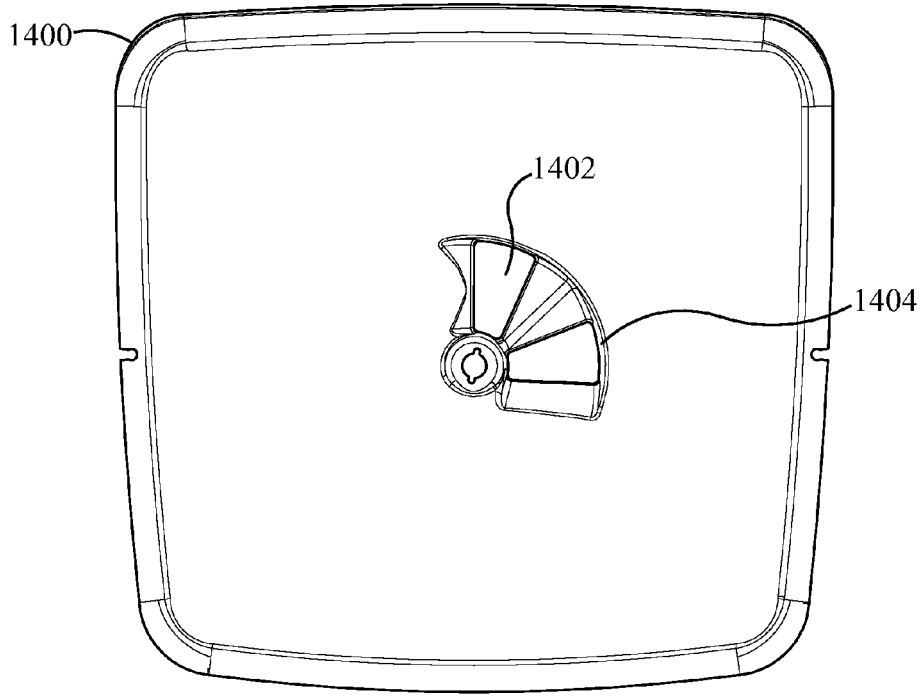
FIG. 14 is a top view of yet another example embodiment of a removable insert in accordance with an aspect of the innovation.

Referring to FIG. 14, a third example embodiment of a removable insert 1400 is illustrated in accordance with an aspect of the innovation. The removable insert 1400 includes multiple (i.e., two) medium sized openings 1402 thereby forming a third hole pattern 1404 that produces a low volume particulate output. Because the openings 1402 are smaller than the openings 1302 described above, the hole pattern 1404 is more suitable for use with smaller particulate material such as fine grass seeds (e.g., Bermuda), low application rate chemicals (pesticide/herbicide), the application of fire ant baits, and very fine particulate and/or granular materials.

Figure 15:
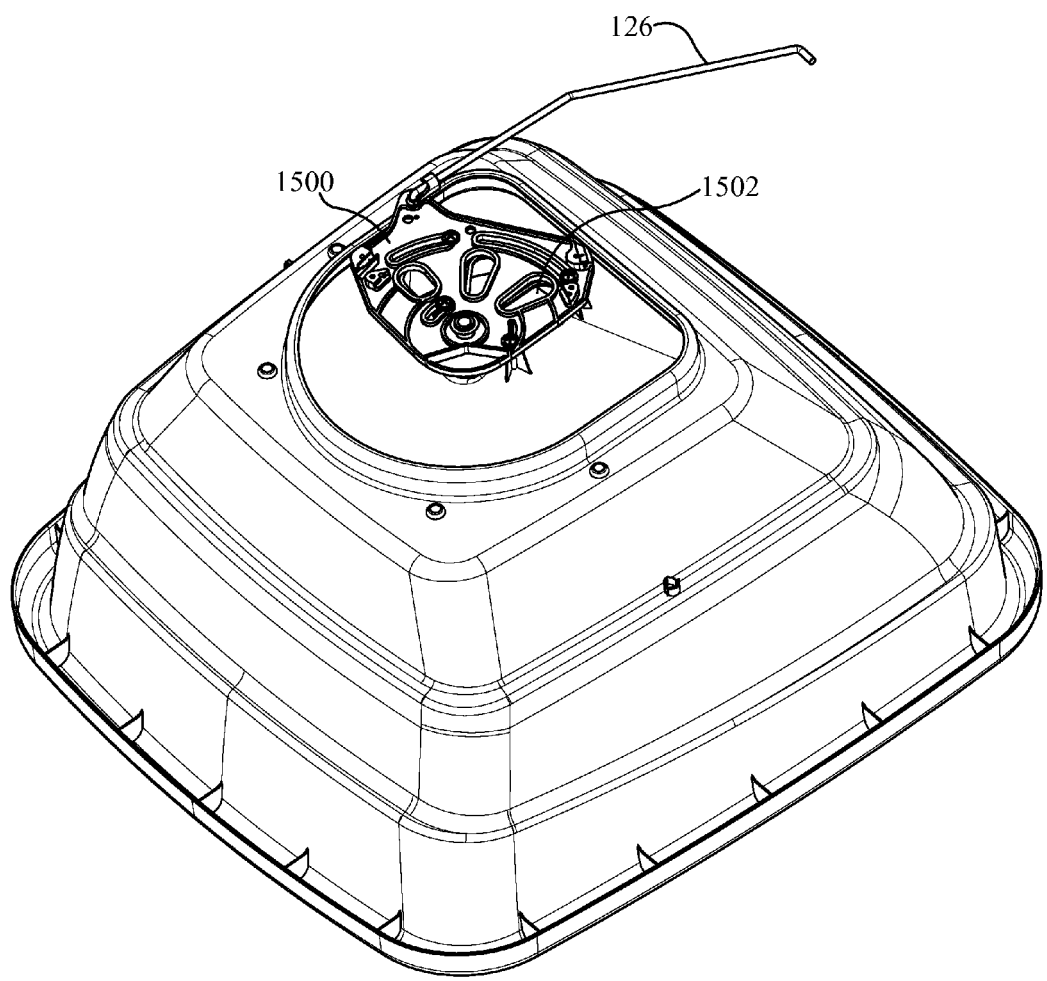
FIG. 15 is a bottom perspective view of a vessel illustrating an example embodiment of a shut-off/adjustment mechanism in accordance with the innovation.

Referring to FIG. 15, in another example embodiment, the particulate dispersing apparatus 100, 200 illustrated in FIGS. 1 and 2 and described herein may include a shut-off/adjustment plate 1500 that includes openings 1502. The openings 1502 are similar in quantity, size and shape to the openings 1202, 1302, 1402 described above. In the example embodiment illustrated in FIG. 15, the shut-off/adjustment plate 1500 has openings 1502 similar in quantity, size and shape to the openings 1202 described in the first example embodiment above and is, thus, for illustrative purposes only and is not intended to limit the scope of the innovation.

The shut-off/adjustment plate 1500 is connected to the open-close/adjustment assembly 110 via the connector rod 126 described above. As described above, when the lever 124 is in a first (full forward) position, as shown in FIG. 5, the open-close/adjustment assembly 110 is in a full closed position. In this position, the shut-off/adjustment plate 1500 covers the openings 1202, 1302, 1402 in the corresponding removable insert and is, thus, in a full closed position thereby preventing any particulate from exiting the dispersing apparatus 100. Conversely, when the lever 124 is in a second (full rearward) position, the open-close/adjustment assembly 110 is in a full open position. In this position, the shut-off/adjustment plate 1500 of the removable insert 106 is not covering the openings 1202, 1302, 1402 of the corresponding removable insert, thus, allowing a maximum flow of particulate to be dispersed by the dispersing apparatus 100. In other words, the holes 1502 in the shut-off/adjustment plate 1500 are aligned with the openings 1202, 1302, 1402 in the corresponding removable insert thereby allowing particulate material to flow out of the vessel 104. In addition, the shut-off/adjustment plate 1500 of the removable insert 106 can be operated at any position between the full closed position and the full open position to thereby vary the amount of particulate material dispersed by the dispersing apparatus 100.

Figure 16:
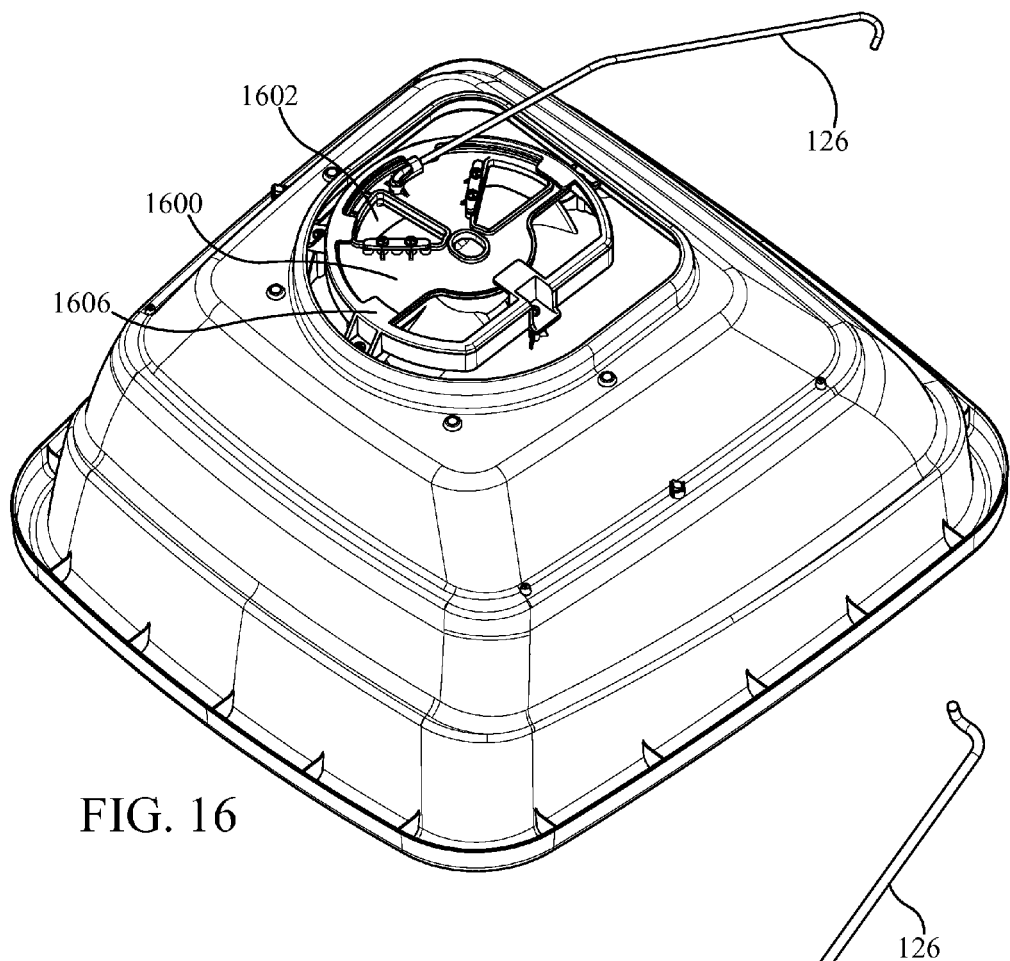
FIG. 16 is a bottom perspective view of a vessel illustrating another example embodiment of a shut-off/adjustment mechanism in accordance with the innovation.
Figure 17:
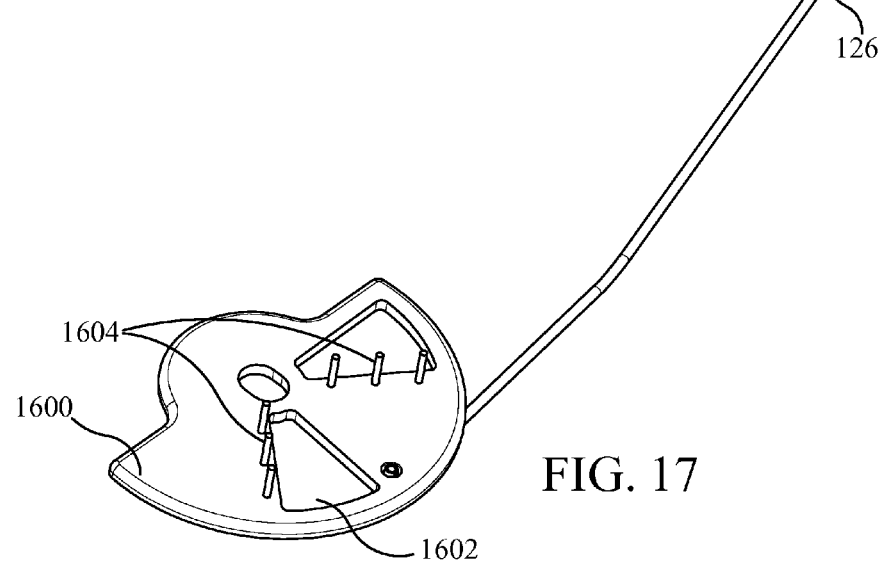
FIG. 17 is a perspective view of the shut-off/adjustment mechanism of FIG. 16 illustrating a location of agitating pins in accordance with the innovation.
Figure 18:
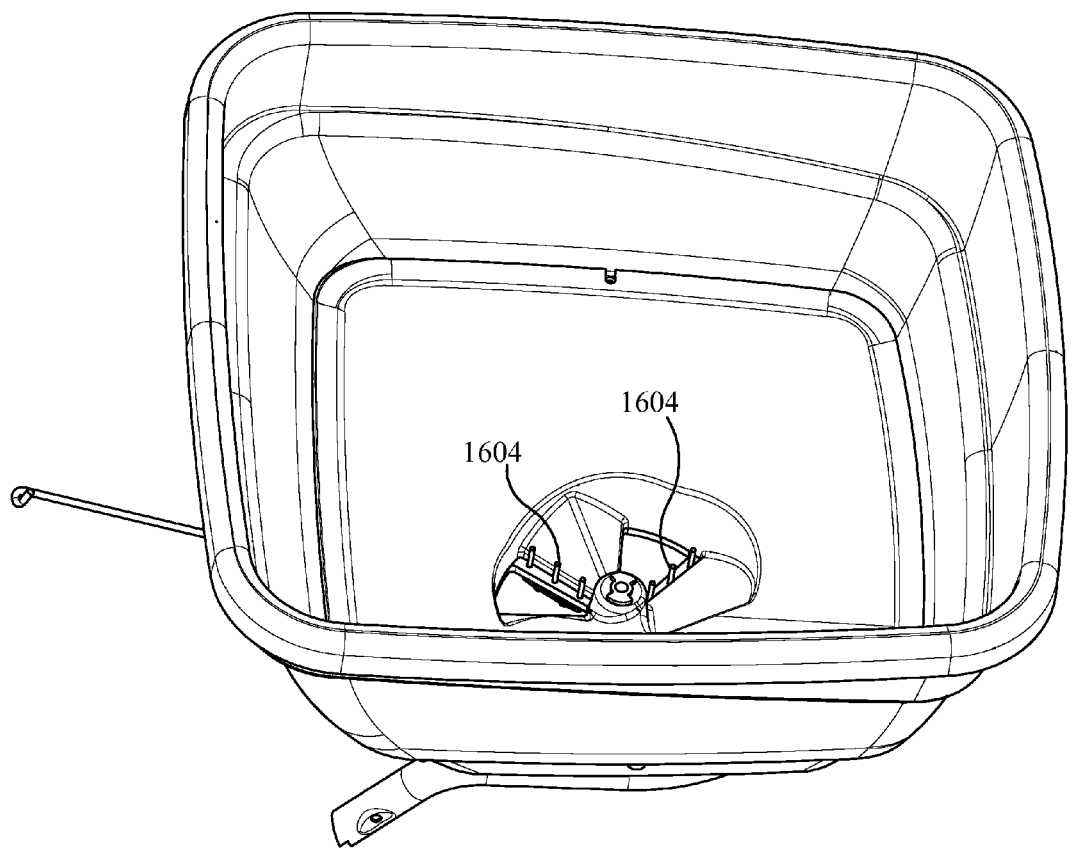
FIG. 18 is a top perspective view of the vessel of FIG. 16 illustrating the location of the agitating pins of FIG. 17 in accordance with the innovation.

In yet another embodiment, illustrated in FIGS. 16-18, the particulate dispersing apparatus 100, 200 illustrated in FIGS. 1 and 2 and described herein may include a shut-off/adjustment plate 1600 that includes openings 1602 and agitator pins 1604. The agitator pins 1604 are disposed at an edge of the one or more openings 1602. Thus, the agitator pins 1604 are also disposed at an edge of the openings 1202, 1302, 1402 of the corresponding removable insert. During operation of the particulate dispensing apparatus 100, the agitating pins 1604 oscillate, which agitates and feeds the particulate material out of the openings in the removable inserts and the shut-off/adjustment plate 1600 thereby, creating a more uniform and consistent flow of particulate material to the impeller, thus, creating a better spread of particulate material across a spread pattern. A collar 1606 can be included and attached to a bottom of the vessel to provide additional support for the shut-off/adjustment plate 1600.

Figure 19:
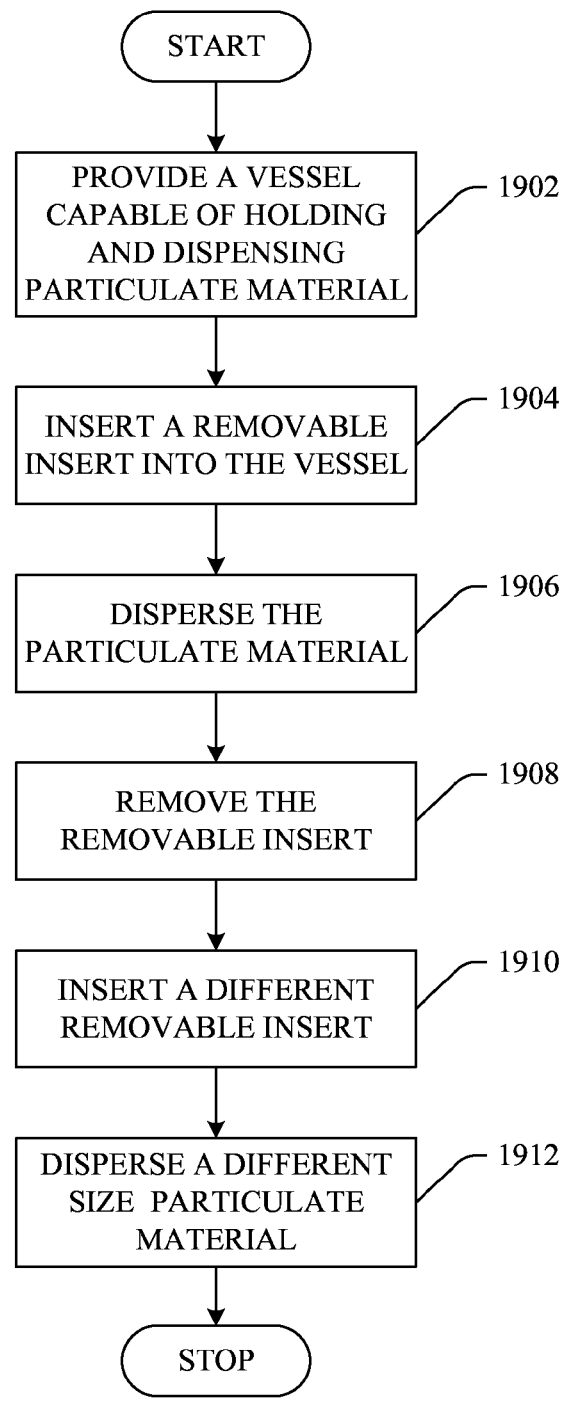
FIG. 19 is an example flow chart illustrating a method of interchanging a removable insert in accordance with an aspect of the innovation.

Referring to FIG. 19, a method of configuring a particulate material dispensing apparatus to accommodate different sized particles is illustrated. At 1902, a vessel that holds and dispenses particulate material is provided. At 1904, a removable insert is placed into an inside of the vessel, whereby the removable insert has a hole pattern that includes a least one opening to accommodate the dispensing of a particulate material having a particular size. At 1906, the particulate material is dispersed. At 1908, the removable insert is removed from the vessel. At 1910, a different removable insert is placed into the vessel, whereby the different removable insert has a different hole pattern distinct from the hole pattern of the removable insert. At 1912, a different size particulate material is dispersed. The different size of the different particular material corresponds with the different hole pattern of the different removable insert. Further, the different particular size is distinct from the particular size of the particulate material that corresponds with the removable insert.

In yet another example embodiment illustrated in FIGS. 20A-20N, the particulate dispersing apparatus 100, 200 illustrated in FIGS. 1 and 2 and described herein may include a rotatable type removable fastener (hereinafter "rotatable fastener") 2000 that removably attaches to a hopper 2004 thereby facilitating quick removal and replacement of removable inserts 2006. It is to be understood, that the hopper 2004 and the removable insert 2006 are similar to the hopper 104 and the removable inserts 106 described above, except for those features related to the rotatable fastener 2000, and thus, will not be repeated.

The rotatable fastener 2000 rotates approximately 90 degrees between a secured position securing the removable insert 2006 to the hopper 2004 and an unsecured position allowing removal and replacement of the removable insert 2006, as will be described further below. As shown in FIG. 20B, the rotatable fastener 2000 is an integrated piece that includes a cylindrical body 2008, a pair of opposite projections 2010 extending substantially perpendicular from a bottom of the cylindrical body 2008, a washer-like portion 2012 disposed substantially perpendicular at a top of the cylindrical body 2008, a grip region 2014 extending upward from the top of the cylindrical body 2008, and a pair of ribs 2016 extending outward from opposite sides of the grip region 2014.

Figure 20A:
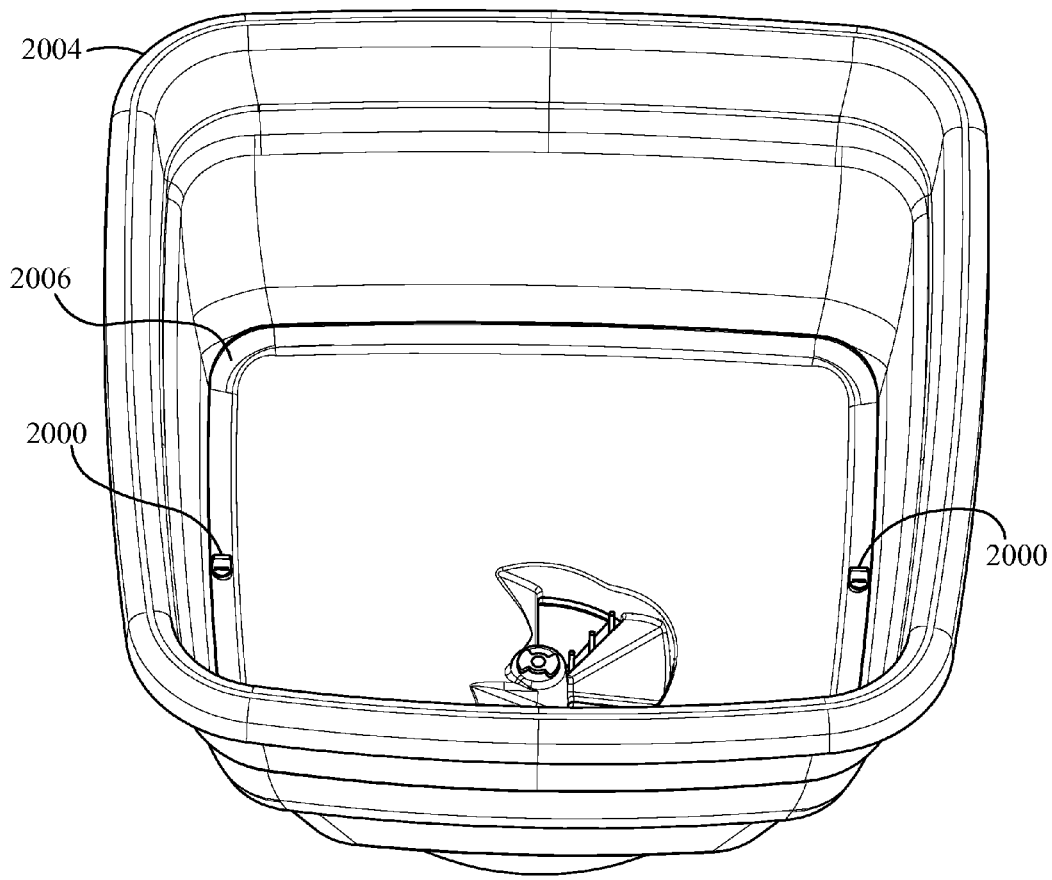
FIG. 20A is a top perspective view of another example embodiment of a vessel incorporating a removable fastener in accordance with an aspect of the innovation.
Figure 20B:
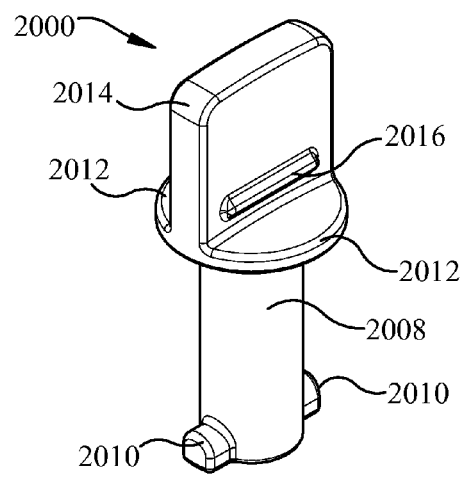
FIG. 20B is a perspective view of the removable fastener in accordance with an aspect of the innovation.
Figure 20C:
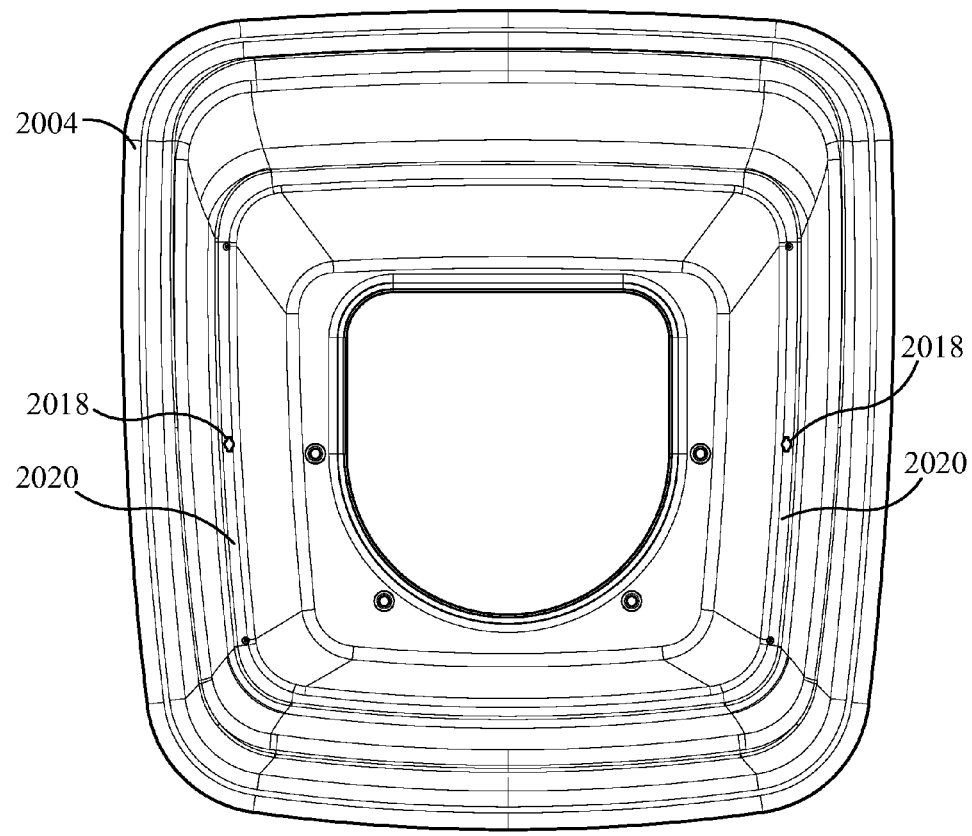
FIGS. 20C-20H are various views of a vessel illustrating a location and shape of an attachment aperture in accordance with an aspect of the innovation.
Figure 20D:
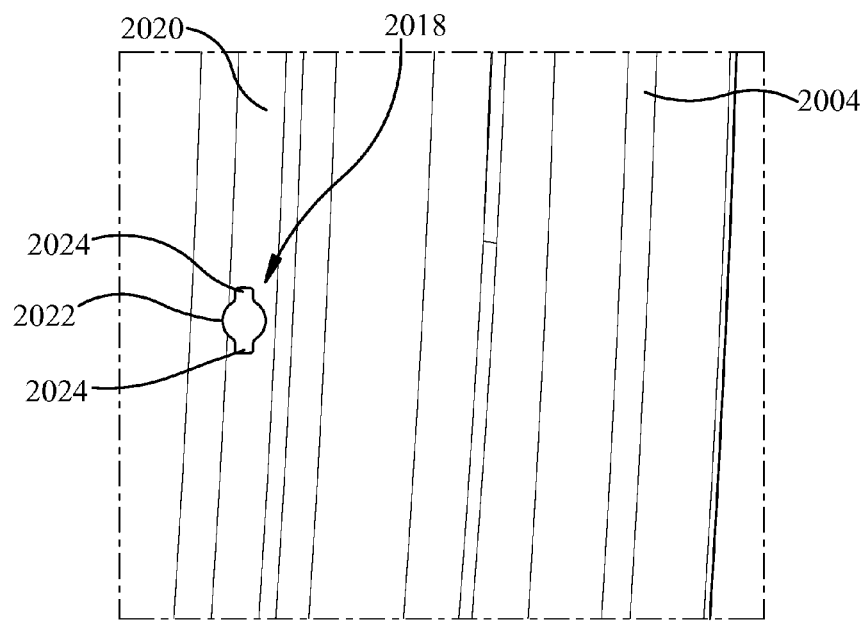
Figure 20E:
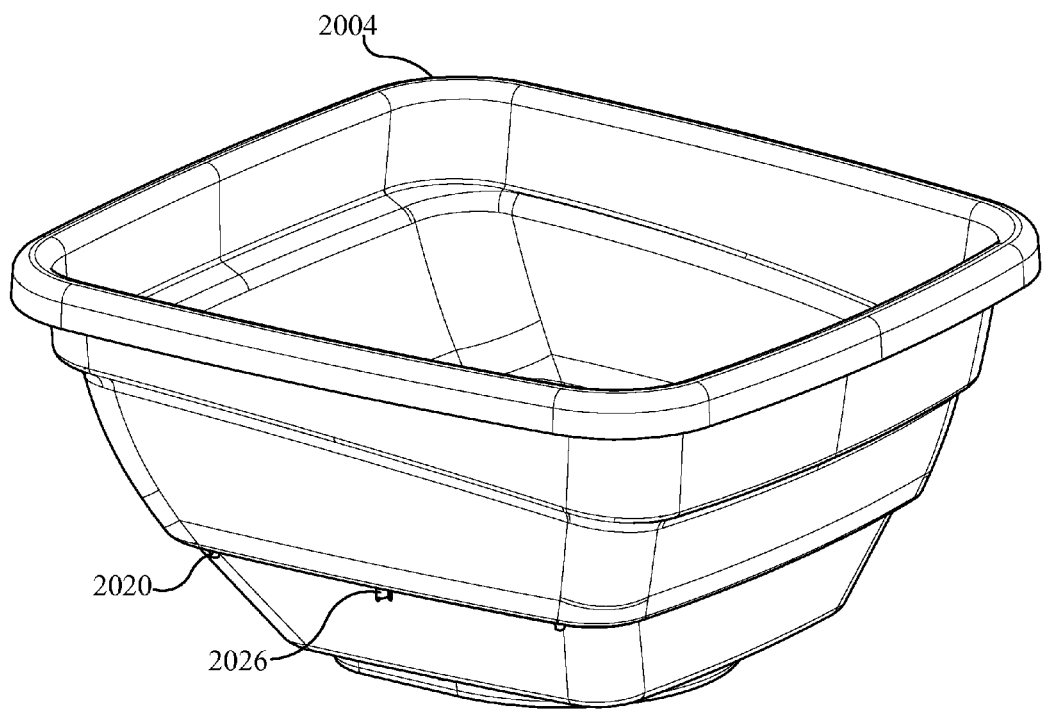
Figure 20F:
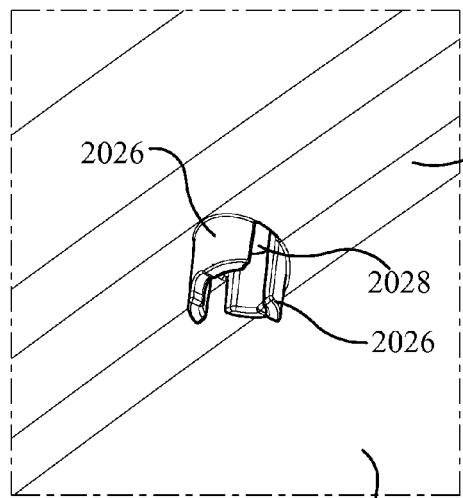
Figure 20G:
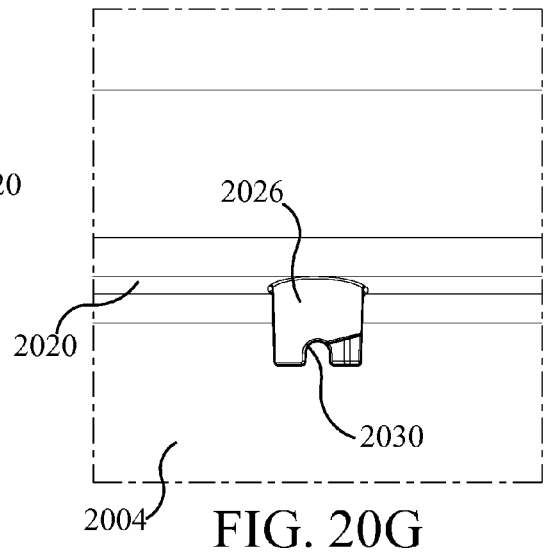

Referring to FIGS. 20C and 20D, attachment aperture(s) 2018 are defined in a ridge 2020 in two or more sides of the hopper 2004 and are adapted to receive the rotatable fastener 2000 thereby securing the removable insert 2006 to the hopper 2004. Specifically, the attachment aperture(s) 2018 includes a center circular portion 2022 adapted to receive the cylindrical body 2008 of the rotatable fastener 2000, and slots 2024 extending from opposite sides of the center circular portion 2022 adapted to receive the pair of opposite projections 2010 of the rotatable fastener 2000.

Figure 20H:
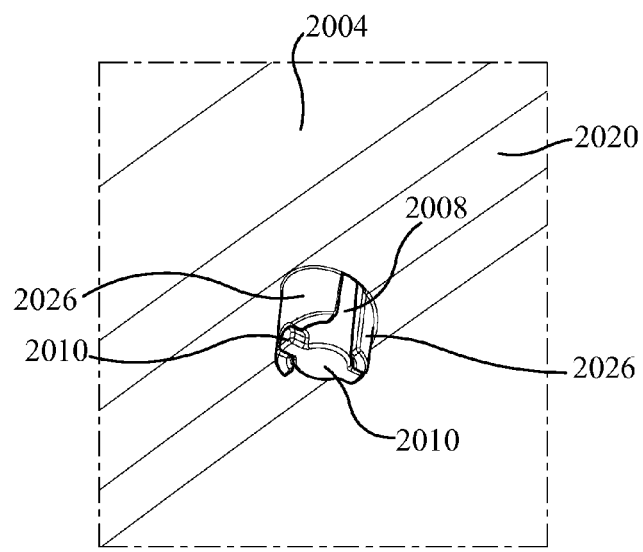

Referring to FIGS. 20E-20H, a pair of protrusions 2026 extends from a bottom of each attachment aperture 2018 on an outside bottom of the ridge 2020. The protrusions 2026 are equally spaced around the attachment aperture 2018 and are separated by a pair of spaces 2028 on diametrically opposite sides of the attachment aperture 2018. Each protrusion 2026 includes a notch 2030 that receives the projections 2010 on the rotatable fastener 2000, as illustrated in FIG. 20H.

Figure 20I:
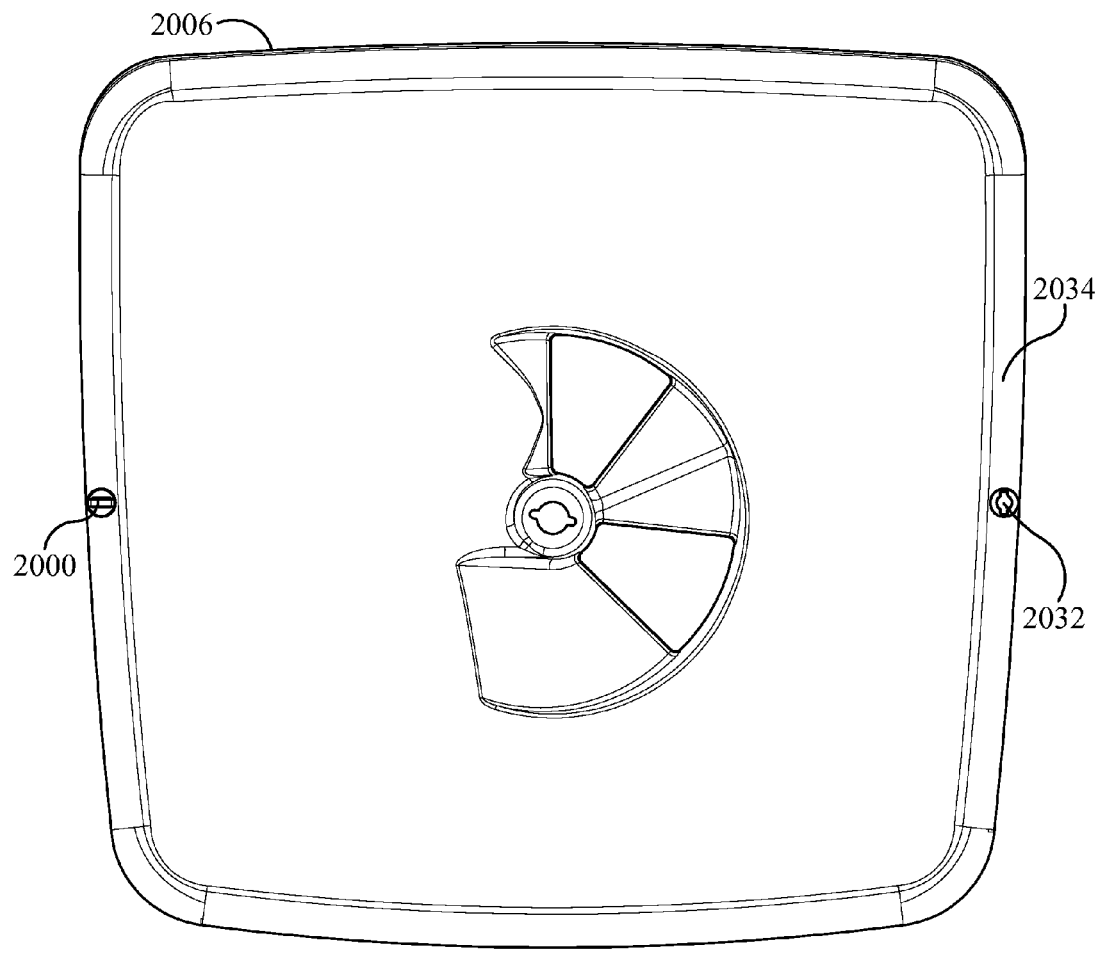
FIGS. 20I and 20J are top and close-up views respectively of a removable insert illustrating a location and shape of an attachment slots in accordance with an aspect of the innovation.
Figure 20J:
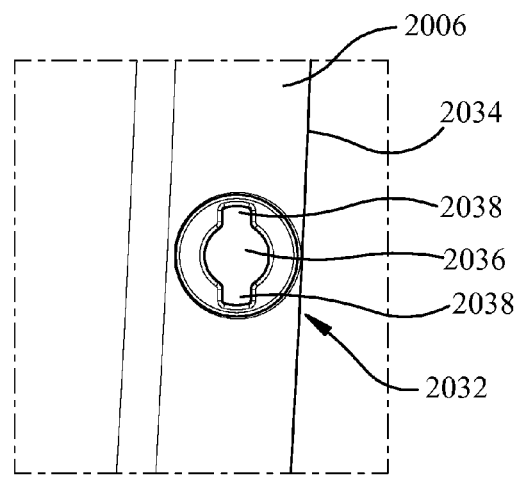
Figure 20K:
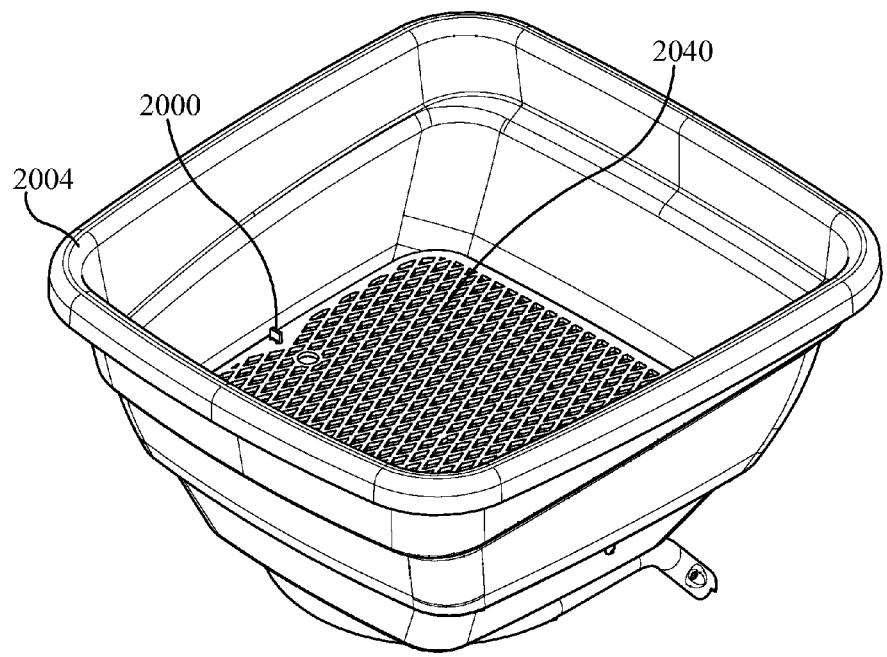
FIGS. 20K-20N are various views of a vessel incorporating a debris screen in accordance with an aspect of the innovation.
Figure 20L:
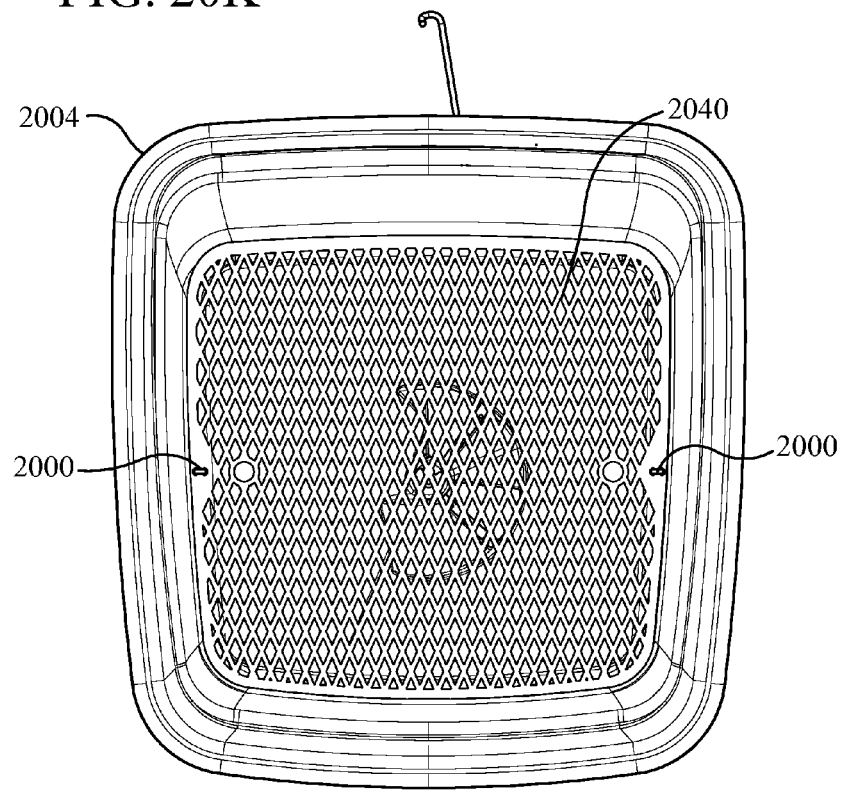
Figure 20M:
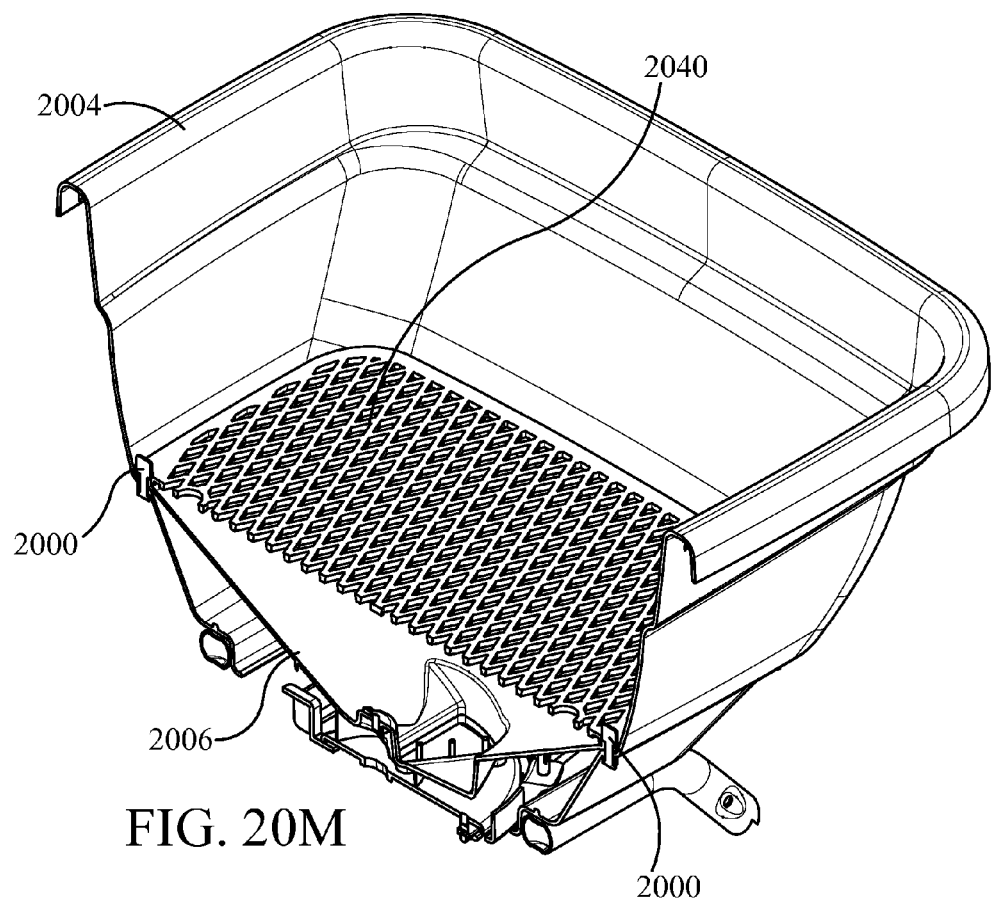

Referring to FIGS. 20I and 20J, attachment slot(s) 2032 are defined in a perimeter 2034 of the removable insert 2006 that align with the attachment apertures 2018 in the hopper 2004. The attachment slot(s) 2032 includes a center circular portion 2036 adapted to receive the cylindrical body 2008 of the rotatable fastener 2000, and slots 2038 extending from opposite sides of the center circular portion 2036 adapted to receive the pair of opposite projections 2010 of the rotatable fastener 2000.

Figure 21:
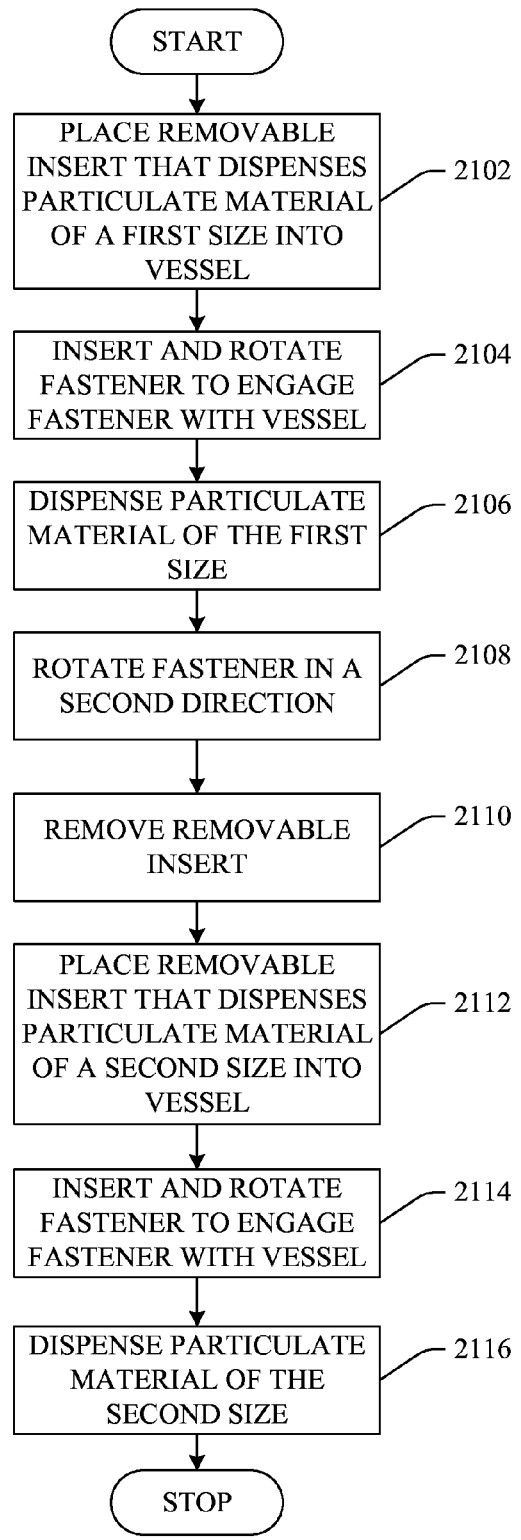
FIG. 21 is another example flowchart illustrating method of interchanging a removable insert in accordance with an aspect of the innovation.

Referring to FIG. 21, to secure the removable insert 2006 inside the hopper 2004, the removable insert 2006 is placed inside the hopper 2004 as previously described with reference to FIG. 8. Once properly inserted, the perimeter 2034 of the removable insert 2006 engages the ridge 2020 inside the hopper 2004 such that the removable insert 2006 sits inside the hopper 2004 as shown in FIG. 20A. In addition, once the removable insert 2006 is properly inserted, the attachment slots 2032 defined in the removable insert 2006 are aligned with the attachment apertures 2018 defined in the hopper 2004. More specifically, once the removable insert 2006 is properly inserted into the hopper 2004, the slots 2024 on each attachment aperture 2018, the slots 2038 on the attachment slot(s) 2032, and the spaces 2028 between the protrusions 2026 are aligned. Thus, the rotatable fastener 2000 is inserted through the attachment slots 2032 and the attachment apertures 2018 such that the projections 2010 on the cylindrical body 2008 go through the slots 2024 on each attachment aperture 2018, the slots 2038 on the attachment slot(s) 2032, and the spaces 2028 between the protrusions 2026. The rotatable fastener 2000 is then rotated approximately 90 degrees until the projections 2010 engage the notch 2030 on the protrusion 2026. When the projections 2010 engage the notch 2030, the washer-like portion 2012 engages a top of the removable insert 2006 thereby ensuring that the removable insert 2006 is secured inside the hopper 2004. To remove the rotatable fastener 2000 and replace the removable insert 2006, the rotatable fastener 2000 is simply rotated in the opposite direction approximately 90 degrees and pulled out of the hopper 2004 and the removable insert 2006. The removable insert 2006 can then be removed once all the rotatable fasteners 2000 are removed.

Referring to FIGS. 20K-20N, the example embodiment can include a debris screen 2040 in accordance with an aspect of the innovation. The debris screen 2040 sits inside the hopper 2004 on top of the removable insert 2006 and prevents foreign objects from entering the hopper 2004 and interfering with the particulate material inside the hopper 2004.

The debris screen 2040 includes fastening slots 2402 that receive the grip region 2014 on the rotatable fastener 2000 and one or more removal apertures 2044 that facilitate the removal of the debris screen 2040. To install, the debris screen is simply placed inside the hopper 2004 such that the fastening slots 2042 align with the grip region 2014 on the rotatable fastener 2000. The debris screen 2040 is then pressed downward such that the rib 2016 on each side of the grip region 2014 engages a side of the fastening slot 2042 thereby providing a snap fit and ensuring that the debris screen 2040 is secured inside the hopper 2004. To remove, one simply inserts an external object (e.g., finger) into each removal aperture 2044 and lifts the debris screen 2040 off the grip region 2014 of the rotatable fastener 2000 to overcome the snap interference and out of the hopper 2004. When the debris screen 2040 is not in use each rib 2016 is exposed.

Figure 20N:
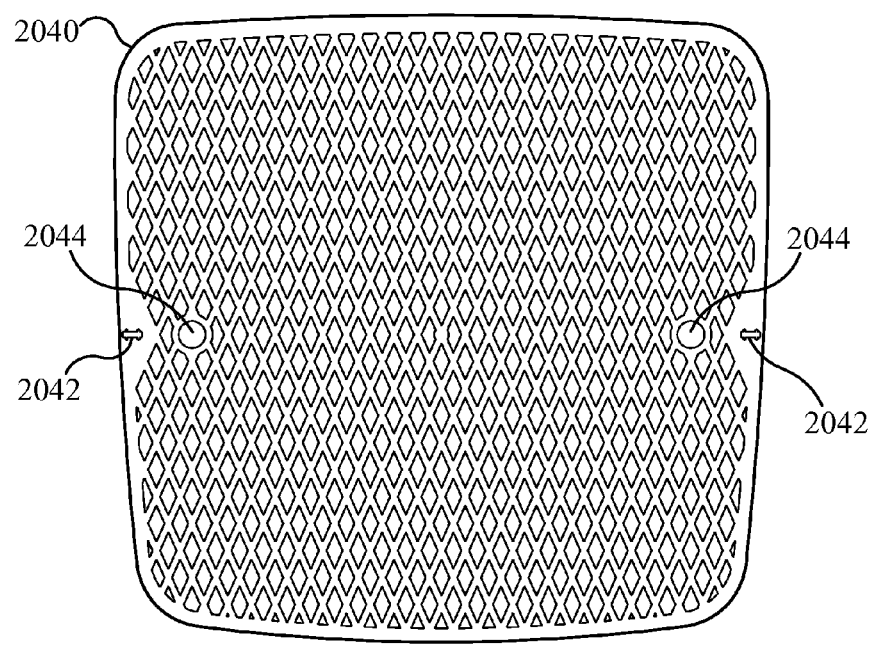

One advantage to the example embodiment illustrated in FIGS. 20A-20N is that the configuration allows the particulate dispersing apparatus 100 to be used with or without a debris screen 2040. Another advantage of the example embodiment is that the rotatable fastener 2000 can be used to accommodate each assembly condition (i.e., with or without debris screen). Thus, multiple fasteners are not required for each assembly condition.

Referring to FIG. 21, a method of changing the output of a particulate material dispensing apparatus to accommodate different sized particles is illustrated. At 2102, a removable insert 2006 having a first hole pattern that dispenses particulate material of a first size is placed into the hopper (or vessel) 2004. At 2104, the fastener 2000 is inserted and rotated in a first direction until the projection 2010 engage the notch 2030 on the protrusion 2026. At 2106, the particulate material of a first size is dispersed. At 2108, the fastener is rotated in a second direction and removed from the hopper 2004. At 2110, the removable insert 2004 is removed from the hoper 2006. At 2112, a different removable insert 2006 having a second hole pattern that dispenses particulate matter of a second size is placed into the hopper 2004. At 2114, the fastener 2000 is inserted and rotated in the first direction until the projection 2010 engages the notch 2030 on the protrusion 2026. At 2116, the particulate material of the second size is dispensed.

Although multiple features have on some occasions been discussed herein as being incorporated into single embodiments in order to convey aspects of the subject innovation concisely, it is to be appreciated that these features are independent, and various embodiments can incorporate some of these features without others (e.g., novel drop hole designs, even if used in connection with fixed bottom hoppers; agitators; interchangeable inserts; floating gearbox; etc.) as will become evident from the description below.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for dispersing particulate material comprising:
    a vessel configured to contain particulate material, the vessel including an opening defined in a bottom portion, attachment apertures defined in a ridge in two or more sides of the vessel, and a pair of protrusions extending away from the ridge on an outside of the vessel, the pair of protrusions including a notch defined in a bottom edge of each of the pair of protrusions and being separated by a pair of spaces such that the pair of protrusions are equally spaced around the attachment apertures;
    a plurality of interchangeable inserts adapted to be removably attached to an inside of the vessel whereby the plurality of interchangeable inserts have hole patterns that are distinct to facilitate the flow of different sized particulate material from inside the vessel; and
    a plurality of fasteners rotatable between a securing position and an unsecuring position that facilitate the removal and replacement of the plurality of interchangeable inserts and including a cylindrical body and a pair of projections extending substantially perpendicular in opposite directions from a bottom of the cylindrical body, wherein the plurality of fasteners are inserted through the attachment apertures such that the pair of projections slide in the pair of spaces separating the pair of protrusions and are rotated such that the pair of projections engage the notch defined in the bottom edge of each of the pair of protrusions thereby securing the plurality of inserts inside the vessel.

2. The system of claim 1, wherein the fastener further includes a grip region that facilitates rotation of the fastener and a washer-like portion disposed between the cylindrical body and the grip region, and wherein the washer-like portion engages a top of the insert when the pair of projections engage the notch thereby securing the insert in the vessel.

3. The system of claim 1, wherein the distinct hole patterns includes at least one opening defined in a bottom surface of the plurality interchangeable inserts and wherein a size of the at least one opening for each of the plurality of interchangeable inserts is larger or smaller than each of the other plurality of interchangeable inserts.

4. The system of claim 1, wherein a bottom surface of the plurality of interchangeable inserts transitions in a downward direction from a perimeter of the plurality of interchangeable inserts toward the distinct hole pattern of the plurality of interchangeable inserts to facilitate the flow of the particulate material out of the vessel.

5. The system of claim 1 further comprising a plurality of agitator pins disposed adjacent to the hole pattern to facilitate a uniform flow of particulate material out of the vessel.

6. The system of claim 1 further comprising an adjustment assembly configured to regulate a flow rate of particulate material through the distinct hole patterns.

7. The system of claim 1, wherein the system is configured for use on a walk behind spreader.

8. The system of claim 1, wherein the system is configured for use on a tow spreader.

9. A method of changing the output of a particulate dispensing apparatus comprising:
    placing a removable insert having a first hole pattern that dispenses particulate material having a first size into a vessel;
    inserting a removable fastener through an attachment aperture defined in the particulate dispensing apparatus such that at least one projection on the fastener extends through the attachment aperture and slides along a space defined between a pair of protrusions extending from the attachment aperture;
    rotating the removable fastener in a first direction until the at least one projection on the removable fastener engages a notch defined in a bottom edge of the pair of protrusions;
    dispensing the particulate material of the first size;
    rotating the removable fastener in a second direction until the at least one projection disengages from the at least one notch in the protrusion;
    removing the removable insert;
    placing a removable insert having a second hole pattern that dispenses particulate material having a second size into a vessel;
    rotating the removable fastener in the first direction until the at least one projection on the fastener engages the at least one notch in the protrusion extending from the bottom of the attachment apertures; and
    dispensing the particulate material of the second size.

10. The method of claim 9, wherein prior to rotating a removable fastener in a first direction until at least one projection on the fastener engages at least one notch in a protrusion extending from a bottom of the attachment apertures, the method includes aligning attachment slots on the removable insert with attachment apertures in the vessel and inserting the removable fastener through the attachment slots and the attachment apertures.

11. The method of claim 9, wherein the particulate material dispersing apparatus is a walk-behind spreader or a tow spreader.

12. The system of claim 1 further comprising a debris screen disposed inside the vessel on top of the plurality of inserts that facilitates the prevention of foreign substance from mixing with the particulate material.

13. The system of claim 12, wherein the plurality of fasteners further include a grip region and the debris screen includes fastening slots adapted to receive the grip region of the fastener when the debris screen is disposed on top of the plurality of inserts.

14. The system of claim 13, wherein the fastener further includes ribs disposed on each side of the grip region such that when the debris screen is properly placed inside the vessel, each rib engages a side of the fastening slots defined in the debris screen thereby securing the debris screen inside the vessel.

15. The system of claim 14, wherein the debris screen further includes at least one removal aperture adapted to receive an external object to facilitate the removal of the debris screen from the vessel.

* * * * *